United States Patent
Siegel et al.

(10) Patent No.: US 8,260,456 B2
(45) Date of Patent: Sep. 4, 2012

(54) RETAIL SHELF SUPPLY MONITORING SYSTEM

(75) Inventors: Norman L. Siegel, Mentor, OH (US); Gregory M. Bird, Solon, OH (US); Kenneth G. Rhineberger, Perry, OH (US); James Bacnik, Mentor, OH (US); Paul Mueller, Wadsworth, OH (US); Daniel Kump, Highland Heights, OH (US); William H. Walker, Fairlawn, OH (US)

(73) Assignee: Fasteners For Retail, Inc., Cleveland, OH (US)

( * ) Notice: Subject to any disclaimer, the term of this patent is extended or adjusted under 35 U.S.C. 154(b) by 619 days.

(21) Appl. No.: 12/410,586

(22) Filed: Mar. 25, 2009

(65) Prior Publication Data

US 2009/0248198 A1    Oct. 1, 2009

(51) Int. Cl.
*G06F 17/00* (2006.01)
*B65H 7/00* (2006.01)
*G05B 19/00* (2006.01)

(52) U.S. Cl. ........ 700/244; 700/232; 700/231; 700/243; 221/4; 221/92; 340/5.92

(58) Field of Classification Search .................. 700/231, 700/232, 241–244, 236, 225; 340/5.92
See application file for complete search history.

(56) References Cited

U.S. PATENT DOCUMENTS

| | | |
|---|---|---|
| 4,339,709 A | 7/1982 | Brihier |
| 5,069,349 A | 12/1991 | Wear et al. |
| 5,608,643 A | 3/1997 | Wichter et al. |
| 5,671,362 A | 9/1997 | Cowe et al. |
| 5,818,336 A | 10/1998 | Varga et al. |
| 5,821,513 A | 10/1998 | O'Hagan et al. |
| 6,195,006 B1 | 2/2001 | Bowers et al. |
| 6,259,965 B1 * | 7/2001 | Steele et al. .................. 700/228 |
| 6,269,285 B1 | 7/2001 | Mignault |

(Continued)

FOREIGN PATENT DOCUMENTS

CH    265058    11/1949

(Continued)

OTHER PUBLICATIONS

POS—ePusher Intelligence for your shelf, POS TUNING Udo Voβhenrich GmbH & Co., KG, 6 pgs.

*Primary Examiner* — Michael K Collins
(74) *Attorney, Agent, or Firm* — Fay Sharpe LLP

(57) ABSTRACT

An inventory shelf monitoring system includes a plurality of track systems located on at least one shelf of a retail or warehouse establishment. Each track system includes a sensor and actuator that determines the position of a product pusher. The identity and location of the product pusher, for each track system on the at least one shelf, is sent to a data acquisition and transmitter circuit that assembles, formats, and transmits pusher position data to a central receiver, which receives corresponding data from all shelves employing the system in the retail or warehouse establishment. The data is then transmitted to a central processing unit in a user device that maintains data corresponding to product count, availability, and activity associated with each track unit of each shelf employing the system in the retail or warehouse establishment. Inventory control, the prevention of out-of-stock situations, and the assessment of activity indicative of theft or accident is thus monitored in real time for prompt remedial action.

15 Claims, 24 Drawing Sheets

U.S. PATENT DOCUMENTS

| | | |
|---|---|---|
| 6,502,012 B1 | 12/2002 | Nelson |
| 6,539,280 B1 | 3/2003 | Valiulis et al. |
| 6,684,126 B2 | 1/2004 | Omura et al. |
| 6,732,014 B2 | 5/2004 | Whitten et al. |
| 6,755,322 B1 | 6/2004 | Herzog et al. |
| 6,802,412 B2 * | 10/2004 | Lapeyre et al. .......... 198/370.02 |
| 6,837,427 B2 | 1/2005 | Overhultz et al. |
| 6,886,700 B2 | 5/2005 | Nagel |
| 6,895,296 B2 | 5/2005 | Holt et al. |
| 6,951,305 B2 | 10/2005 | Overhultz et al. |
| 6,990,317 B2 | 1/2006 | Arnold |
| 7,021,535 B2 | 4/2006 | Overhultz et al. |
| 7,152,040 B1 | 12/2006 | Hawthorne et al. |
| 7,757,890 B2 * | 7/2010 | Alford et al. ...................... 221/2 |
| 7,792,711 B2 * | 9/2010 | Swafford et al. ................ 705/28 |
| 2004/0056091 A1 | 3/2004 | Overhultz et al. |
| 2005/0040123 A1 * | 2/2005 | Ali ............................... 211/59.3 |
| 2005/0168345 A1 * | 8/2005 | Swafford et al. .......... 340/686.1 |
| 2005/0279722 A1 * | 12/2005 | Ali ............................... 211/59.3 |
| 2006/0163180 A1 * | 7/2006 | Rankin et al. ................ 211/59.3 |
| 2006/0243737 A1 | 11/2006 | Lanz |
| 2007/0080123 A1 | 4/2007 | Mason |
| 2007/0273513 A1 | 11/2007 | White |
| 2011/0282768 A1 | 11/2011 | Swafford, Jr. et al. |

FOREIGN PATENT DOCUMENTS

| | | |
|---|---|---|
| DE | 3628609 A1 | 2/1988 |
| DE | 19714799 C2 | 10/1998 |
| EP | 1081663 A2 | 7/2001 |
| EP | 1541064 A1 | 6/2005 |
| EP | 1541064 B1 | 2/2006 |
| WO | WO01/76423 A2 | 10/2001 |
| WO | WO2005/074563 A2 | 8/2005 |
| WO | WO2006/023954 A2 | 3/2006 |
| WO | WO2007/085211 A1 | 8/2007 |

* cited by examiner

Low Stock Report (Date and Time Range: Based on last reported activity.)

Categories: 1st Aid, Allergy, Baby, Cough & Cold, Diabetes, Diet, Family Planning, Heart Health, Oral, Pain, Skin, Stomach Output to File | Print

| Category | Item# | Product | Count | Section | Shelf | Last Activity |
|---|---|---|---|---|---|---|
| ▶ Oral | 126359 | WATRPIK ORAL IRRG,WP50 | 1 | A | 6 | 02/29/2008 16:26:21 |
| Heart Health | 156062 | CVS BPMONTR MANUAL,1CT | 1 | A | 1 | 03/03/2008 15:07:00 |
| Diabetes | 168156 | PRECISION XTRA MTR, KIT | 1 | A | 5 | 03/04/2008 10:27:03 |
| Diet | 211346 | METABO EPHEDRAFR, 30CT | 1 | B | 1 | 03/02/2008 11:45:19 |
| Oral | 234374 | SONICARE ELITE, 7300 | 0 | A | 5 | 02/26/2008 13:08:08 |
| Heart Health | 239959 | ORON MANINF ARM, 4322 | 0 | A | 3 | 03/02/2008 11:46:13 |
| Stomach | 250973 | PRILOSEC OTC, 28CT | 0 | A | 1 | 03/01/2008 18:59:02 |
| Stomach | 250978 | PRILOSEC OTC, 28CT | 0 | A | 1 | 03/01/2008 17:09:12 |
| Heart Health | 269701 | ONRONAUTOBP W/CUF, 780 | 1 | A | 3 | 03/03/2008 18:55:44 |
| Heart Health | 271243 | CVS BPMON SEMIAUTO, 3BXO | 1 | A | 1 | 03/03/2008 18:56:03 |
| Heart Health | 271244 | CVS BPMON AUTO/MAN, 3AA1 | 0 | A | 1 | 02/26/2008 11:29:07 |
| Heart Health | 271245 | CVS BPMON AUTO, 3BX0 | 0 | A | 1 | 02/26/2008 11:04:01 |
| Heart Health | 271248 | CVS BPWRST MON MAN, 3BU1 | 1 | A | 1 | 02/26/2008 12:33:19 |
| Heart Health | 271249 | CVS BPWRST MNTR, 3BU1 | 0 | A | 1 | 03/03/2008 18:52:49 |
| Oral | 276597 | CVS BPWRST MON MAN, 3BU1 | 1 | A | 2 | 03/02/2008 18:16:14 |
| Baby | 279683 | SIMILAC SENSITIVE | 0 | A | 3 | 02/26/2008 10:14:56 |
| Baby | 279683 | SIMILAC SENSITIVE | 0 | A | 3 | 02/26/2008 10:14:35 |

FIG. 21

Pilferage Report (02/28/2008 12:00:00 AM to 13/15/2008 12:00:00 AM)

Output to File | Print

Categories: 1st Aid, Allergy, Baby, Cough & Cold, Diabetes, Diet, Family Planning, Heart Health, Oral, Pain, Skin, Stomach

| Pilferage Type | Category | Item# | Product | Current Count | Last Count | Section | Shelf | Timestamp |
|---|---|---|---|---|---|---|---|---|
| ▲ Product | Family Planning | 680645 | TROGAN MGNM LUBR,12CT | 3 | 5 | A | 3 | 03/04/2008 |
| Product | Family Planning | 692202 | EPT PREG TEST, 2CT | 0 | 4 | B | 2 | 03/04/2008 |
| Product | Family Planning | 692202 | EPT PREG TEST, 2CT | 2 | 4 | B | 2 | 03/04/2008 |
| Product | Family Planning | 210542 | TROGAN ULT THN SPM,12CT | 3 | 5 | A | 3 | 03/04/2008 |
| Product | Family Planning | 690032 | EPT PREG TEST, 1CT | 4 | 8 | B | 2 | 03/04/2008 |
| Product | Family Planning | 690032 | EPT PREG TEST, 1CT | 5 | 8 | B | 2 | 03/04/2008 |
| Product | Family Planning | 692202 | EPT PREG TEST, 2CT | 4 | 4 | B | 2 | 03/04/2008 |
| Product | Diet | 396698 | CYLARIS, 50CT | 0 | 2 | E | 3 | 03/03/2008 |
| Product | Baby | 187381 | SIMILAC ADVW/RPWD, 25.7 | 1 | 2 | A | 3 | 03/03/2008 |
| Product | Baby | 187382 | SIMILAC ADVW/RPWD, 12.9 | 2 | 3 | A | 4 | 03/03/2008 |
| Product | Baby | 187382 | SIMILAC ADVW/RPWD, 12.9 | 2 | 3 | A | 4 | 03/03/2008 |
| Product | Baby | 208508 | SIMILC NEOSURE ADV, 12.8 | 1 | 2 | A | 2 | 03/03/2008 |
| Product | Baby | 208508 | SIMILC NEOSURE ADV, 12.8 | 1 | 2 | A | 2 | 03/03/2008 |
| Product | 1st Aid | 440190 | AVEENO ECZEMA CREAM | 1 | 3 | G | 2 | 03/03/2008 |
| Product | Heart Health | 271249 | CVS BPMON SEMIAUTO, 3BXO | 0 | 1 | A | 1 | 03/03/2008 |
| Product | Heart Health | 269701 | OMRON AUTO BP W/CUF,760 | 0 | 1 | A | 3 | 03/03/2008 |

FIG. 22

RETAIL SHELF SUPPLY MONITORING SYSTEM

TECHNICAL FIELD

The disclosure herein relates to monitoring systems for retail shelf supply. More particularly, the disclosure relates to a modular retail shelf system in which a track of the shelf system is monitored with regard to the presence and removal of product from the track in order to ensure security, inventory control, product availability, and the like. Disclosed is a highly integrated modular retail shelf supply monitoring system that accommodates the retrieval and analysis of a wide variety of data to ensure secure and effective operation of retail establishments.

BACKGROUND

In the operation of any retail establishment, and particularly those in which the product for sale is displayed and made readily available upon shelves and within shelf tracks, it is important that restocking of shelves be effected before or immediately upon exhaustion of the product from the shelf. It is further most desirable that theft and other pilferage be minimized and that safeguards be implemented in that regard. Indeed, since product turnover equates to profit in most retail establishments, the ability to constantly monitor on-shelf inventory and product availability and capture data indicative of theft or pilferage is paramount. It is further desirable that such systems include the ability to alert the retail store management with regard to unusual activity, out of stock situations, or pilferage so that corrective action can be taken as soon as possible. The ability to monitor sales activities on the basis of day of the week and time of day is recognized as an important capability in order to enhance sales activities.

It is common in retail establishments that shelves be adjusted, moved, repositioned, or stocked with different products from time to time. Accordingly, the adaptability of retail shelf supply monitoring systems is key to effective operation. Over any course of time, the product available on any particular shelf, or the location of that shelf itself, may vary within the retail establishment. In many instances, these changes occur overnight, during periods of low public use, and yet any monitoring system associated with such a retail establishment must be capable of continuing effective monitoring throughout changeover. In order to accommodate shelf changes and rearrangements, the monitoring system should typically not be hardwired to the shelves or shelf systems, but should be modularized. Moreover, communication with a main control system or data acquisition location must also have minimal hardwiring. It should instead be able to accommodate various arrangements and locations within the retail establishment. In order to maintain the adaptability, and minimize hard wiring, such systems must be, for the most part, battery powered, thus entailing a design that minimizes power without sacrificing effectiveness and reliability.

There remains a need in the art for a system satisfying the criteria just presented.

BRIEF SUMMARY

In various aspects described herein, an inventory shelf monitoring system comprises at least one track system mounted on an associated shelf, the track system including a track receiving a pusher that is biased toward a front end of the track, and a sensor fixed in relation to the track. The system further comprises an actuator attached to the pusher and in communication with the sensor, the sensor emitting a first output signal corresponding to an instantaneous location of the pusher in relation to the track, and a microprocessor coupled to the sensor, wherein the microprocessor controls power to the sensor and measures pusher position. Additionally, the system comprises an electric bus located adjacent a rear end of the track, wherein the microprocessor is coupled to the electric bus. Furthermore, the system comprises a data acquisition and transmitter circuit associated with the associated shelf and in data receiving communication with the sensors of the track system by receipt of the first output signals, the acquisition and transmitter circuit emitting a second output signal corresponding to the identity and location of the pusher of the at least one track system located on the associated shelf as a function of measured pusher position. The system additionally includes a receiver receiving the second output signals.

In accordance with other aspects described herein, a product inventory monitoring system comprises a front rail, a back rail spaced from the front rail, and a plurality of track units coupled to the front rail and the back rail to form a modular system. Each track unit comprises a spring-loaded pusher that applies force to one or more associated product packages to urge the one or more associated packages toward the front rail, and a contact pad mounted on a bottom face of the pusher in contact with a sensor strip mounted to the track, the sensor strip being electrically coupled to a microprocessor in a sensor circuit, wherein the microprocessor is in turn coupled to a plurality of buses mounted to one of the front rail and the back rail. Each track unit further comprises a power source that supplies a voltage to the one of the front rail and the back rail, and a data acquisition and transmitter circuit that is coupled to the track unit and determines a position of the pusher as a function of a voltage difference between the power supply and a voltage detected across the sensor strip. The system further comprises a user device that receives pusher position information and generates a report comprising information related to product package count in each of the plurality of track units.

According to another aspect described herein, a system that facilitates monitoring inventory comprises a data acquisition and transmitter circuit that is interconnected to each of a power bus, a ground bus, and a signal bus. The data acquisition and transmitter circuit comprises a dedicated microprocessor chip that receives the data input signals from the data bus, from each of a plurality of track units associated with the data acquisition and transmitter circuit. A pull-up resistor is located in the track assembly to allow for detection of transmitter cable cutting, shorting of the track buses, etc.

The microprocessor formats data received from the plurality of track units for transmission, and passes a formatted output signal through transmitter circuitry for emission as an RF signal from an antenna. The system further comprises a receiver that receives the transmitted output signal and forwards the transmitted output signal through a router to a user device that generates at least one of an inventory report and a pilferage report.

DESCRIPTION OF THE DRAWINGS

For a complete understanding of the various aspects, structures and techniques of the disclosure reference should be made to the following detailed description and accompanying drawings wherein:

FIG. 21 depicts an example of a low stock report that can be generated using the system(s) described herein to facilitate efficient and timely restocking of shelves in a store;

FIG. 22 illustrates an example of a pilferage report that can be generated using the system(s) described herein;

DETAILED DESCRIPTION OF THE PREFERRED EMBODIMENT

Figure 1:
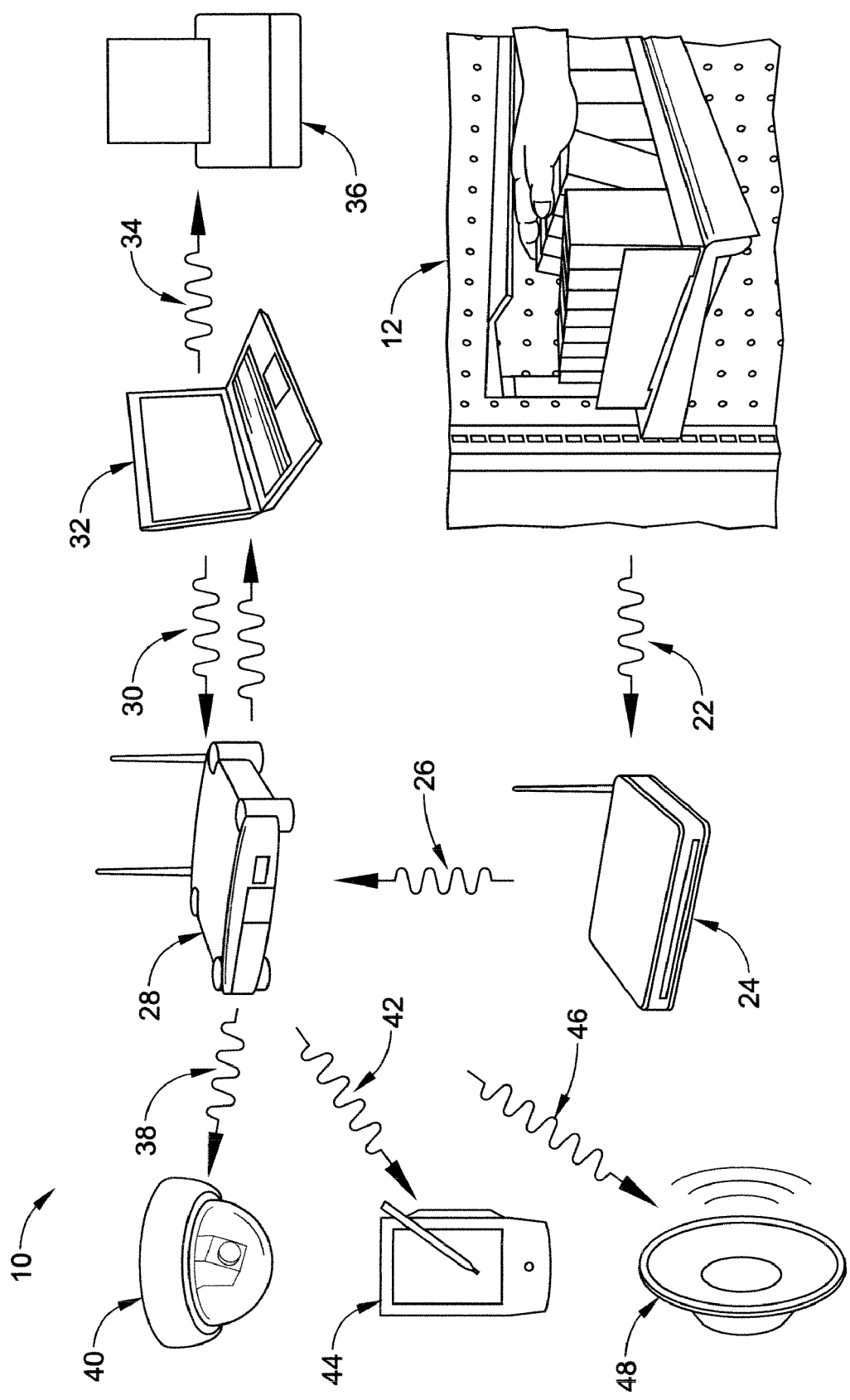
FIG. 1 is a schematic diagram of the retail or inventory shelf supply monitoring system made in accordance with a first embodiment of the present disclosure.

Referring now to the drawings and more particularly FIG. 1, it can be seen that the retail or other shelf supply monitoring system made in accordance with the disclosure is designated generally by the numeral 10. The system 10 can be mounted on one or more of an array of shelves in a retail or warehouse establishment, typically comprised of one or more banks of shelves represented generally by the numeral 12. Such shelves can hold tracks of various sizes, heights and widths to accommodate various products. Those skilled in the art will appreciate that each of the shelves can hold a plurality of tracks, typically separated by dividers, which run perpendicular to the shelf front, with the product being presented from front to rear in each track. Of course, any desired arrangement and configuration of tracks is conducive to implementation with the instant monitoring system. Each shelf or bank of shelves can have associated therewith a circuitry for monitoring the presence, removal and replenishment of product in each of the various tracks. In general, this is accomplished by monitoring the position of the pusher associated with each track. Of course, not all the merchandise being presented on the bank of shelves 12 may justify being monitored. Thus, the system 10 may be present on some shelves and not on others. Alternatively, some of the tracks on a shelf may be monitored while others are not.

The circuitry associated with a desired track or group of tracks in the retail establishment emits radio frequency (RF) signals 22 carrying data regarding the activity of each track being monitored. Typically, such monitoring occurs at each track at a particular preset interval (every every two seconds, every 3 seconds, every 4.2 seconds, etc.).

The data carried by the RF signals 22 is received by a receiver 24 which, by wired or RF signals 26, transmits the data to a router 28 that is in two way communication by connection 30 to a user device 32, which can be a laptop or desktop computer, a PDA, a cell phone, or any other personal computing device. The user device 32 can be connected by connection 34 to a printer 36 for printing of desired reports and the like. In one embodiment, a user can disable one or more tracks, shelves, or arrays of shelves by inputting a command to the user device (e.g., by clicking on an icon associated with one or more tracks or shelves, etc.). For instance, a user can disable inventory monitoring of one or more shelves while the shelves are being restocked, in order to mitigate extraneous inventory reporting and the like. Once the shelves are restocked, the user can re-initiate inventory monitoring thereof by clicking on the same or a different icon.

The router 28 also communicates with wired or RF transmission 38 to a system of closed circuit televisions (CCTV) 40, positioned throughout the retail establishment in relatively concealed fashion for monitoring physical activities within the retail establishment. The router 28 is similarly connected by wired or RF transmission 42 to personal digital assistant (PDA) devices 44, carried by clerical staff and management of the retail establishment for receipt of data from the user device 32. In another embodiment, the router is communicates using a wired or RF transmission link 46 to an in-store sound system 48.

With the system of FIG. 1, data regarding the content, removal and replacement of product within each track of a retail establishment can be constantly monitored. Data regarding activity pertaining to the same can be acquired, logged as to date, time, quantity and the like, employed for various activities including inventory control, sending of out of stock alerts to personnel by means of the PDAs 44, focusing visual monitoring of areas of interest through the CCTV system 40 by means of the router 28 and user device 32, and issuing a wide variety of reports through the printer 36 to facilitate the implementation of improved stocking and management techniques.

A variety of information is provided to a user (e.g., a store manager, a remote corporate manager, etc.) by the system 10. For instance, a product count threshold can be selected for each product (e.g., predetermined or adjusted on the fly), below which an alert is triggered that the shelf 12 requires restocking or attention. For instance, if five packages of a given product fit on a shelf, then the count threshold can be set to one, so a clerk is alerted to restock the shelf when only one package is left thereon.

According to another feature of the system 10, products are time-stamped as they are stocked on the shelves, time-stamped when they are removed by a customer and time-stamped when they are rung up by a cashier. Timestamps can be used for a variety of purposes, including but not limited to pilferage reports or alerts, end-of day reports, alerts to one or more of the user device 32, CCTV 40, PDA 44 or blackberry, in-store sound system 48, etc. For example, if the shelf system detects that an unusually high number of items have been removed from a shelf since a previous measurement, and no such items have been rung up by a cashier for a predetermined time period, then an alert can be sent to a manager indicating that a potential shop lifting event is in progress or has occurred. To further this example, it may be determined that the average time that a customer spends in a given type of store is 15 minutes. In this case, the predetermined time period may be set to 15 minutes. If a large number of product packages are removed from the shelf 12 and not rung up within 15 minutes, an "inactivity" alert is sent to the user device 32 or one of the other means for alerting a store employee (e.g., sound system, CCTV, PDA, etc.). The store employee can then review video from the CCTV system 44 to identify a customer that removed the product packages and monitor the customer through checkout to ensure that the items are paid for. It will be appreciated that the predetermined time may be set to any desired time period, and is not limited to the average time a customer spends in the store.

In another example, the time stamps are employed for periodic reports (e.g., daily, weekly, etc., to provide information about product latency on the shelves. This information can be used when analyzing product popularity with customers and determining whether shelf space allocated for a given product should be adjusted.

According to another feature of the system 10, a user enters parameters to the user device 32 for product monitoring. For instance, the user can enter a monitoring time period for respective days of the week (e.g., 8 am to 8 pm, etc.) to conserve power in the system. Additionally or alternatively, the user can set pusher measurement intervals, pilferage parameters (e.g., removal of N products in X minutes from one or more tracks, lag interval between time stamps for product removal and checkout, etc.), count thresholds that trigger restocking alerts, etc. Pilferage parameters can include a predetermined threshold number of product packages, a time frame for removal of the threshold number of packages, etc., wherein the removal of threshold number of packages can be monitored across one or more tracks containing a given product or products. An alert triggered by any of the foregoing can be timestamped and logged, and can specify the location within the store of the track(s) that triggered the alert.

Figure 2:
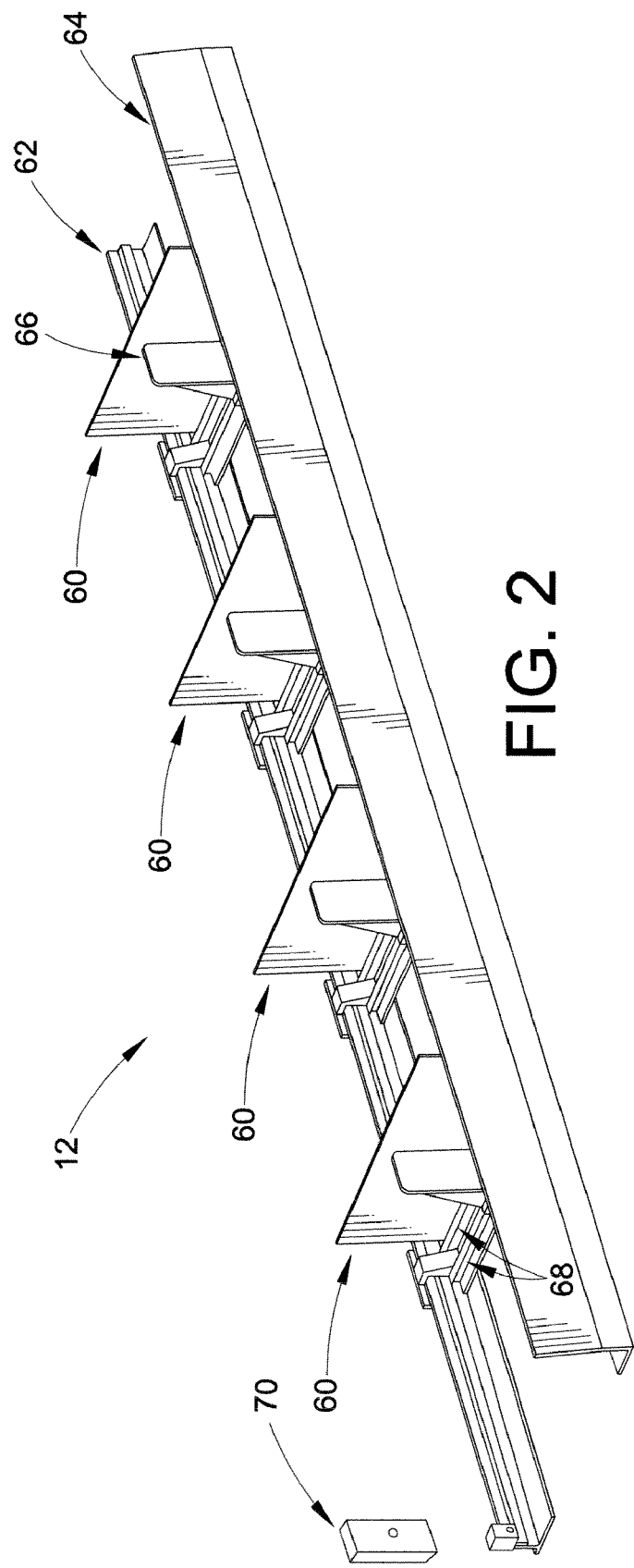
FIG. 2 is a perspective view of a product inventory monitoring system according to one embodiment of the present disclosure, comprising a plurality of track units that receive product and are disposed between a back rail and a front rail.

FIG. 2 illustrates a shelf 12 comprising a plurality of track units 60 that receive product and are disposed between a back rail 62 and a front rail 64. The track units s 60 are oriented normal to the rails 62, 64, and comprise a pusher 66 that urges product toward the front rail 64, such that when a consumer removes a product unit, remaining product units in the track 60 are pushed forward in an orderly fashion and retained between the pusher 66 and the front rail 64. The pusher 66 moves between the back rail 62 and the front rail 64 along a pair of tracks 68. In one embodiment, the track unit 60 comprises a spring (not shown) that supplies a retaining force against the rear of the pusher 66 to urge the pusher 66 forward upon removal of product.

The shelf 12 further comprises a wireless transceiver 70 that receives information from, and transmits information to, each track unit 60. For instance, the transceiver 70 can receive information related to pusher position at predetermined temporal intervals. Dimensions of the product package are stored in and analyzed by a user device, such as the user device 32 (FIG. 1), and thus pusher position can be divided by a corresponding package dimension to determine a number of packages remaining between the pusher 66 and the front rail 64.

The transceiver 70 can additionally receive information from the track unit 60 and/or from product packages (e.g., from an RFID tag or barcode thereon), and a table lookup can be performed (e.g., by the user device 32) to determine product package dimensions or other useful information.

In one example, each track unit 60 includes a processor (not shown) and related circuitry that periodically powers up and reads a position of the pusher to determine how much product is left in the track unit. Pusher position can be determined as a function of voltage and/or current measured in a sliding potentiometer (not shown) coupled to the pusher and positioned longitudinally between the tracks 68. The interval between measurements can be predetermined or selected, and may be on the order of seconds, minutes, hours, etc. By intermittently waking and measuring pusher position, power is conserved. To further conserve power, no data is transmitted to the transceiver unless a position change has been detected between the current position and the position remembered from the prior wake-up. To further conserve power, the transceiver need only send measurement information to the user device if there is a change in pusher position relative to a previous measurement. In this manner, the system of shelves facilitates inventory tracking for a given product during the time between delivery by a supplier and sales to a customer.

According to other features, a plurality of the track units 60 and/or the shelves are used for a single product. Alternatively, different tracks on a single shelf can comprise different products. Still furthermore, the "smart" shelves 12 may be employed in a combination with "dumb" or regular shelving units. In such cases, the smart shelves may be delegated for higher-priced items. Moreover, the tracks 68 are laterally adjustable along the rails 62, 64 to accommodate product packages of different widths. The track systems disclosed herein can be moved throughout a store because they are self-contained units.

Each shelf 12 and each track unit 60 has a unique identity (e.g., an address). When stocking the shelves for a first time with a given product, product identity information is stored in the transceiver (and transmitted on to the user device 32), as is track and shelf identity information. For instance, a user scans a barcode on the product to inform the system of the identity of the product being stocked. The user then scans a barcode located on the track into which the product is being loaded. The user device then pairs the product to the track. This pairing can be employed to perform a table lookup or the like of product data (e.g., package dimensions, etc.) stored in memory (not shown) in the user device. Based on the package dimension information, the user device can determine a distance that the pusher is expected to travel forward upon removal of a product package by a customer. Additionally, a barcode on the shelf can be scanned to tie the product to the entire shelf, when only one product is being place on the shelf.

Figure 3:
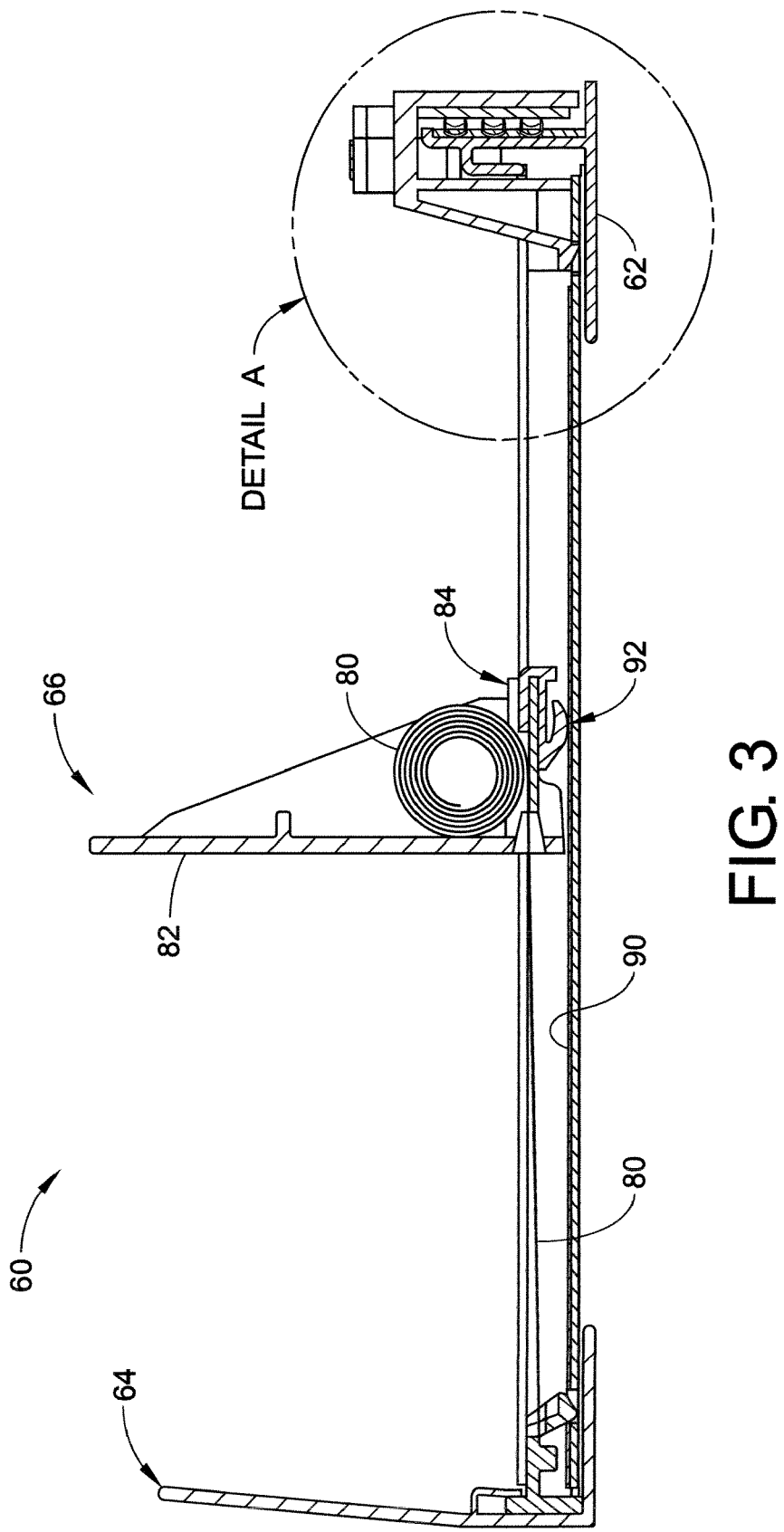
FIG. 3 is an enlarged cross sectional view of the system of FIG. 2.

FIG. 3 illustrates the track arrangement for various embodiments of the disclosure. In one embodiment, each of the track units 60 includes the pair of rails 68 receiving the L-shaped pusher 66, which is urged toward the front wall 64 by means of a coil spring 80 connected to the front wall 64, with the coil being positioned behind and urging against the pusher 66. Accordingly, the pusher 66 is urged toward the front wall 64 in order to secure and retain product therebetween. Those skilled in the art will appreciate that the product is typically in the form of containers which can have a generally rectangular or cylindrical configuration. Of course other product configurations are also known. The monitoring system disclosed herein can also be adapted for use with such other types of products being sold by the merchant. The pusher 66 includes an upwardly extending pusher plate 82, which is substantially normal to a baseplate 84. The coil spring 80 is nested therebetween. A sensor strip 90 is interposed along the length of the track unit 60 and between the pair of tracks 68. The sensor strip 90 can exhibit various characteristics, depending upon the nature of the embodiment employed, and is adapted for contacting engagement a contact pad 92 located on the bottom of the baseplate 84. The sensor strip 90 may be conductive, resistive, capacitive, inductive, or of any various natures dependent upon the nature of the system employed. In one embodiment, the sensor strip 90 is a sliding potentiometer, and the position of the contact pad relative to the back rail 62 is determined as a function of a detected voltage and/or current in the sensor strip. The rearward portion of the track unit 60 coupled to the back rail 62 is marked in FIG. 3 as "Detail A," which is expanded in FIG. 4.

Figure 4:
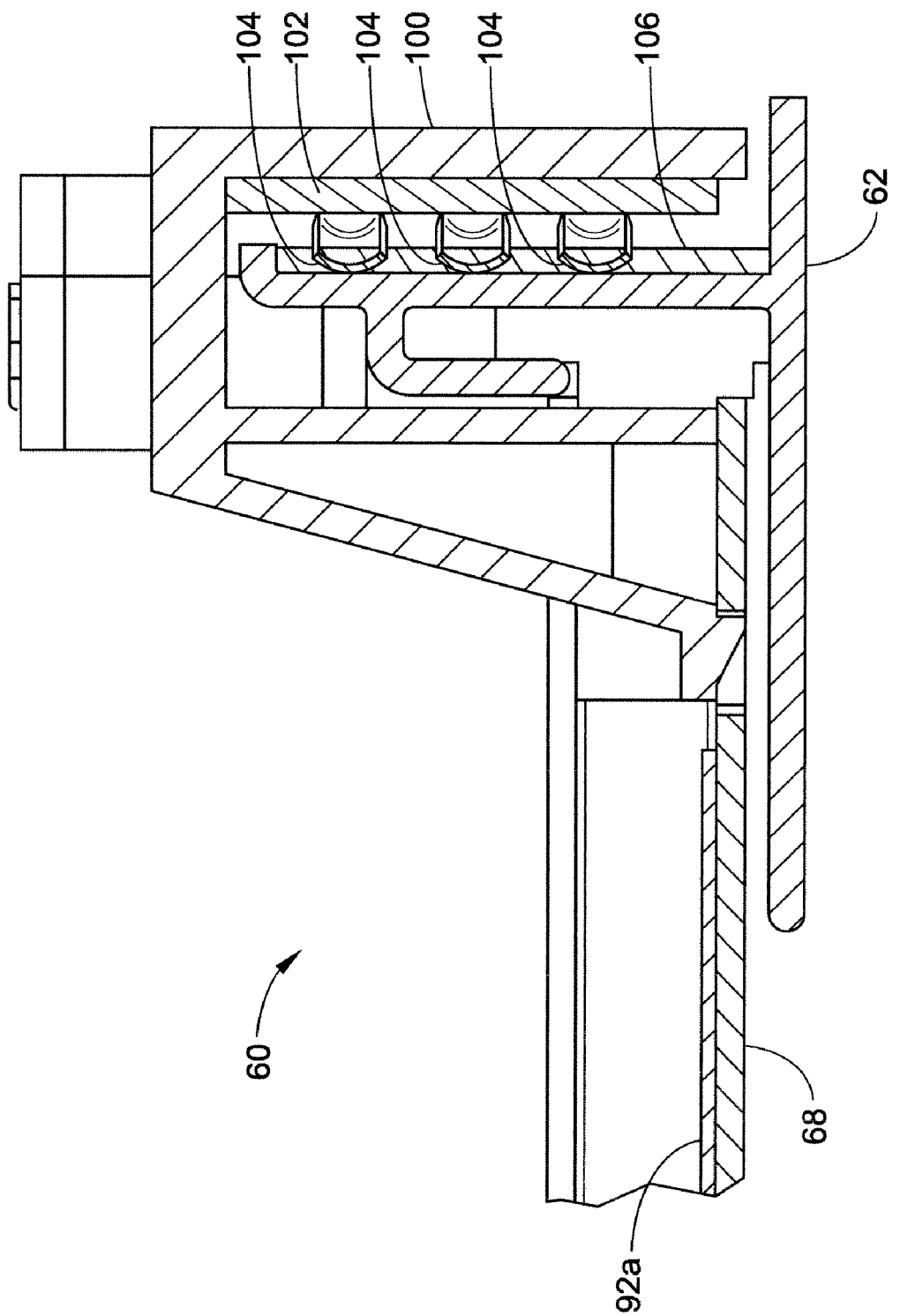
FIG. 4 is an enlarged view of a rear portion of FIG. 3, showing the rear of the track unit coupled to the back rail in greater detail.

FIG. 4 illustrates the rear of the track unit 60 coupled to the back rail 62 in greater detail. The track unit 60 includes a back clip 100 that fits removably over the back rail 62 and includes a printed circuit board (PCB) 102 that mates with three spring connectors 104 on a flex circuit 106 coupled to the back rail 62. The PCB 102 includes a sensor circuit that is coupled by a microprocessor to buses in the flex circuit 106, as described below with regard to FIGS. 14 and 15. The track unit includes a slider or linear potentiometer 90a that is positioned between the tracks 68. The contact pad 92 (FIG. 3) is in forceful contacting engagement with the potentiometer. The potentiometer 90a is a resistive element of uniform cross-section, where the resistance between the contact pad 92 and one end terminal 104 is proportional to the distance between them. As the contact moves (e.g., due to product removal), the voltage between the back rail 62 and Accordingly, movement of the pusher 66 causes the resistance of the potentiometer 90a to change in a manner directly analogous to the position of the pusher 66. Thus, the resulting voltage change is directly analogous to the number of containers of product remaining in the track unit 60. While a spring biased pusher system is illustrated and discussed herein, it will be appreciated that the monitoring system could also be adapted for use with known types of gravity-based pusher systems as well.

Figure 5:
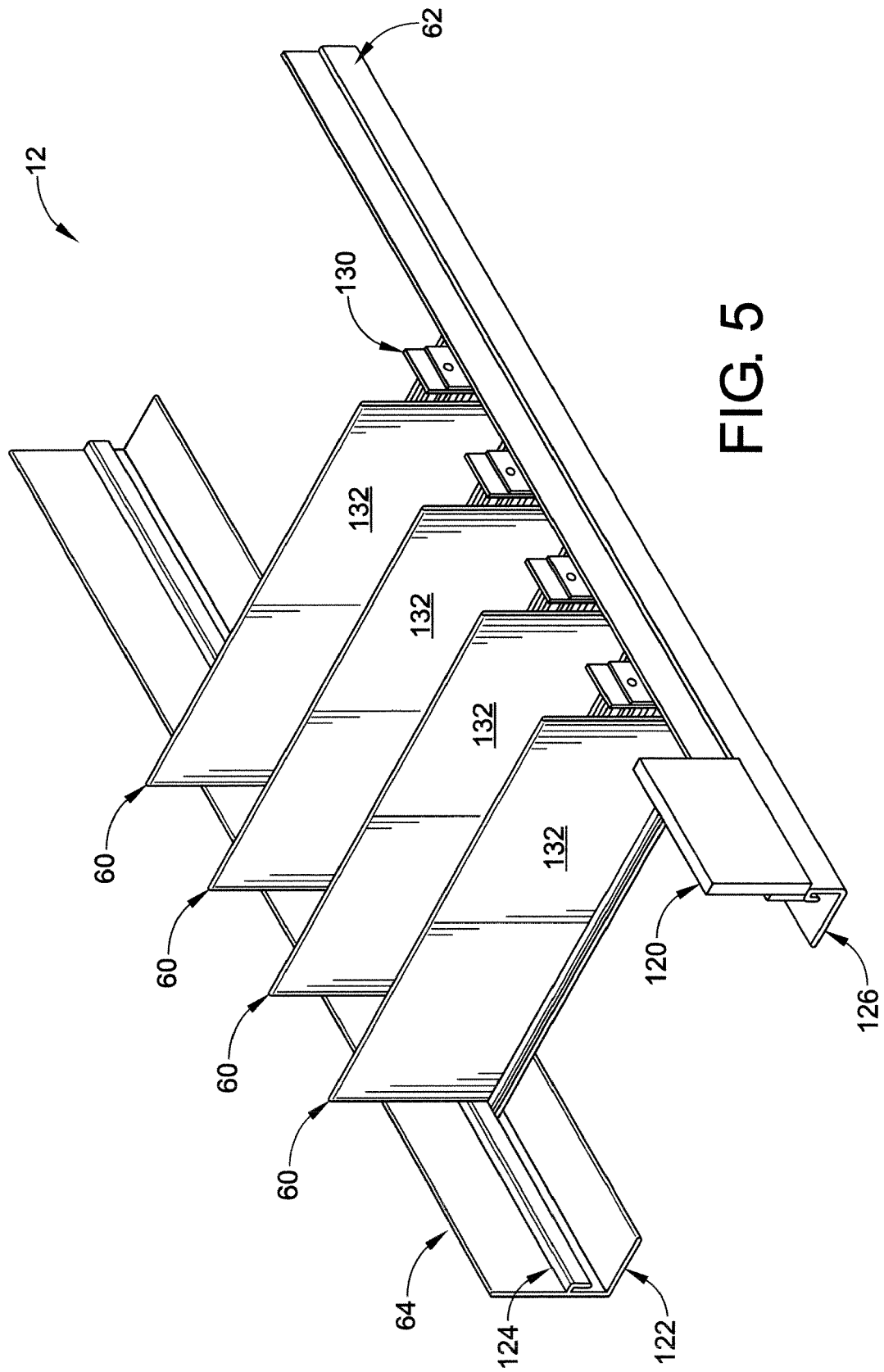
FIG. 5 is a perspective view of a product inventory monitoring system according to another embodiment of the present disclosure, including a plurality of track units disposed between a back rail and a front rail.

FIG. 5 is a perspective view of the shelf system 12 including a plurality of track units 60 disposed between the back rail 62 and the front rail 64. A power source 120 is coupled to the back rail 62 and provides power to the track units 60 for measuring voltage in respective sensor strips. In one embodiment, the power source is a 3V power source (e.g., using two AA batteries or the like); although it will be appreciated that any suitable power source can be employed in accordance with the various embodiments and examples described herein.

The front rail 64 includes a base plate 122 and a front wall 124 that retains product packages in the track unit 60. Similarly, the back rail 62 includes a baseplate 126 and a back wall 128, to which the power source 120 may be mounted. Additionally, each track unit 60 includes a divider 132 that separates product packages in one track unit from packages in an adjacent track unit. Each track unit further comprises a backplate 130 that couples a sensor strip (not shown) to the power source 120.

Figure 6:
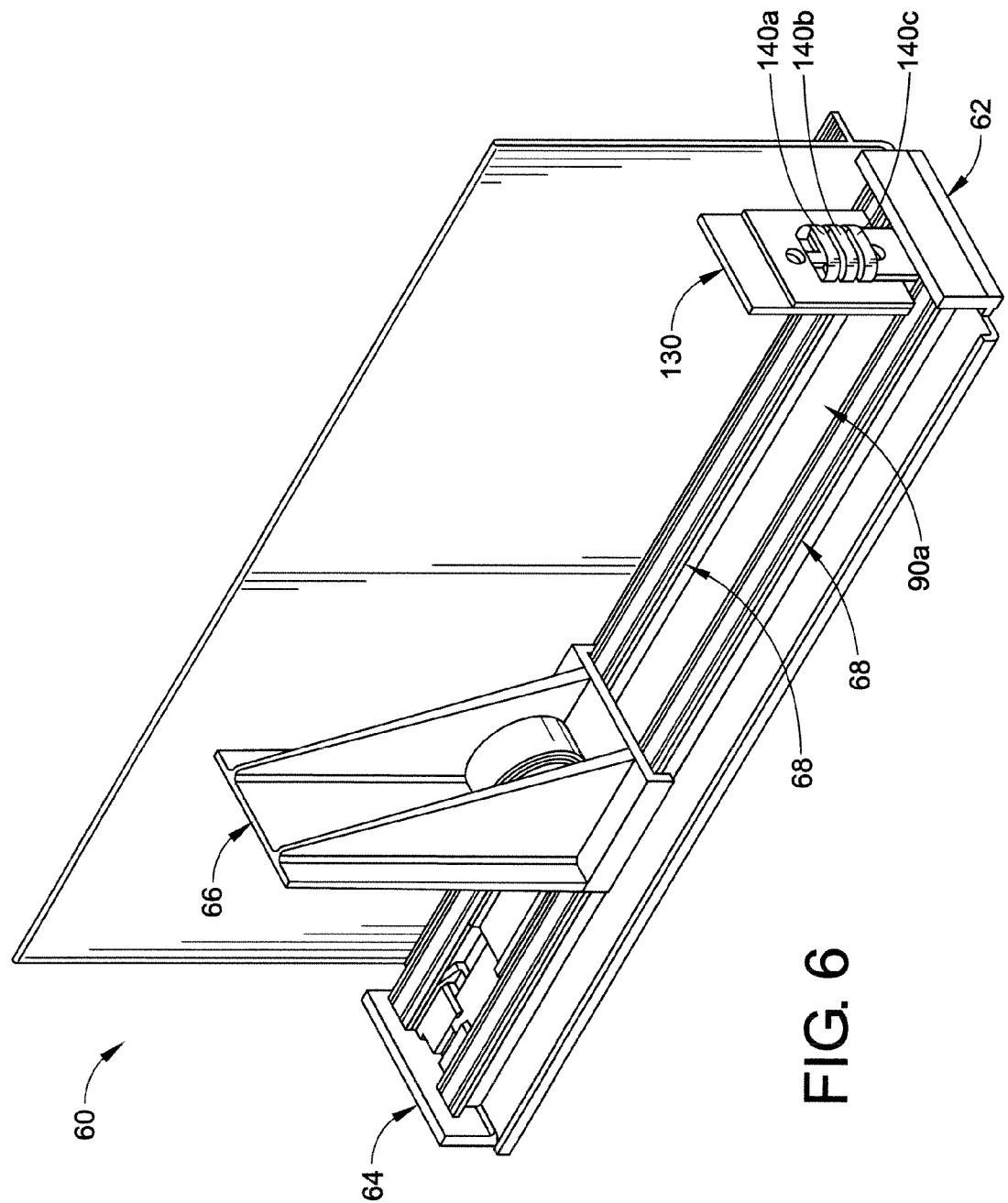
FIG. 6 is a perspective view of an embodiment of the track unit in which the backplate comprises three electrical contacts.

FIG. 6 is a perspective view of an embodiment of the track unit 60 in which the backplate 130 comprises three electrical contacts 140. For example, a first contact 140a may be connected to a positive terminal of the power source to receive current therefrom. A second contact 140b may be employed to detect digital bus signals. A third contact 140c may be connected to ground. In this manner, the position of the pusher 66 may be determined by measuring the voltage at contact 140b. One advantage of providing the contacts on the backplate is to reduce the chance that the contacts will be damaged as product or inventory is removed from or added to the track unit.

According to an example, as distance increases between the pusher 66 and the back rail 62, a greater amount of resistive material in the potentiometer is included in the circuit. As resistance is increased, voltage at contact 140b decreases, assuming a constant current from the power source 120. Thus, voltage at contact 140b correlates to distance between the pusher 66 and the back rail 62. Since product package dimensions are know, including package depth in the direction normal to the front and back rails, product package count can be determined from the voltage measured at contact 140b. A microprocessor (not shown) is connected between the sensor circuit (not shown) and contacts 140a, b, and c, as described with regard to FIGS. 14 and 15.

Figure 7:
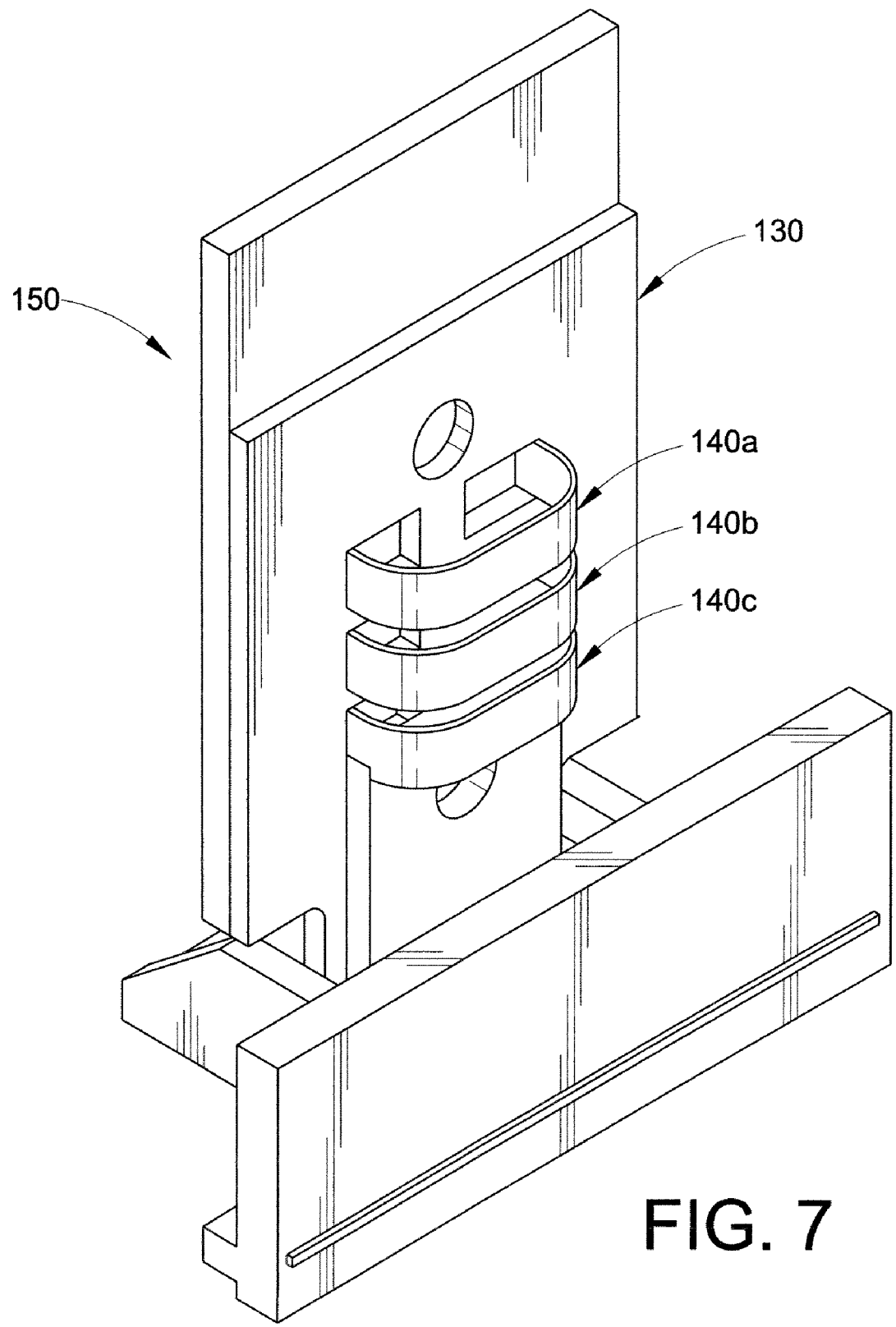
FIG. 7 is an enlarged perspective view of the backplate of the track unit, according to various aspects described herein.

FIG. 7 is a blown-up perspective view of the backplate 130 of the track unit, according to various aspects described herein. The backplate 130 can include the three contacts 140, which extend through the backplate 130 to a printed circuit board (PCB) 150 which contains a track control microprocessor or the like, which is coupled to the backplate 130. In one embodiment, the contacts 140 are vertically oriented.

Figure 8:
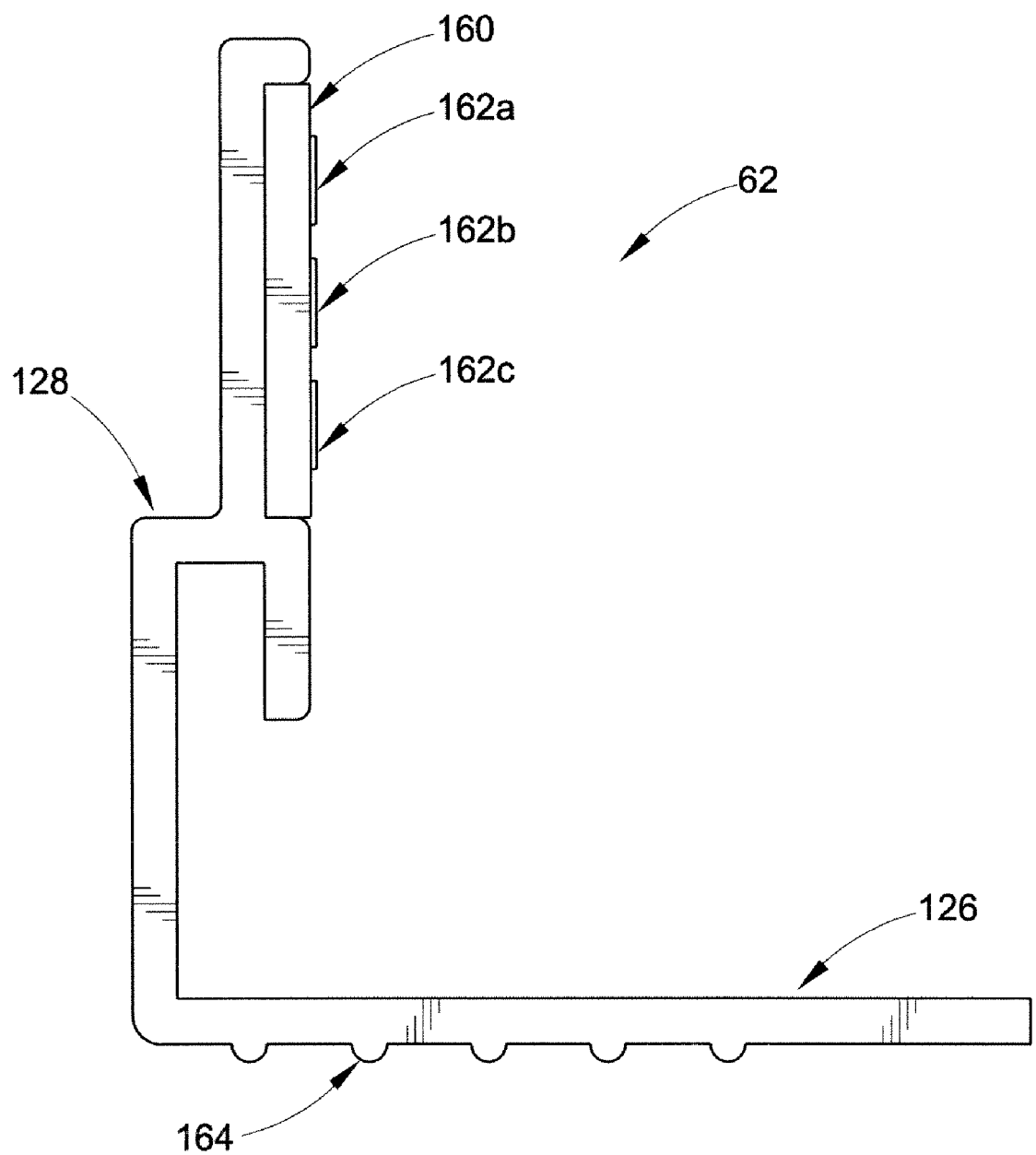
FIG. 8 is a side-view of the back rail of the system of FIG. 5.

FIG. 8 is a side-view of the back rail 62 of the shelf monitoring system 10. The back rail 62 includes the baseplate 126 and back wall 128 for coupling one or more track units 60 to the back rail 62. The back wall 128 includes a PCB 160 with three conductive strips 162a, 162b, 162c that carry current to and from track units. The conductive strips 162 correspond to the electrical contacts 140 on the backplate 130 of the track unit 60. In one embodiment, the conductive strips are vertically oriented and are spaced from the bottom of the back rail. This geometry is advantageous because it reduces the possibility that the strips will be soiled during use of the system, such as by dirt or by leakage of fluids onto the strips. Also, the location of the strips at the rear end of the track reduces the chance of damage to the strips during use of the track to which the monitoring system is attached. The bottom side of the baseplate 126 has a plurality of ridges 164 that extend along the length of the back rail 62 (e.g., into and out of the page), which may be rubber, plastic, or some other material with a relatively high coefficient of friction to stabilize the back rail on a shelf in a store.

Figure 9:
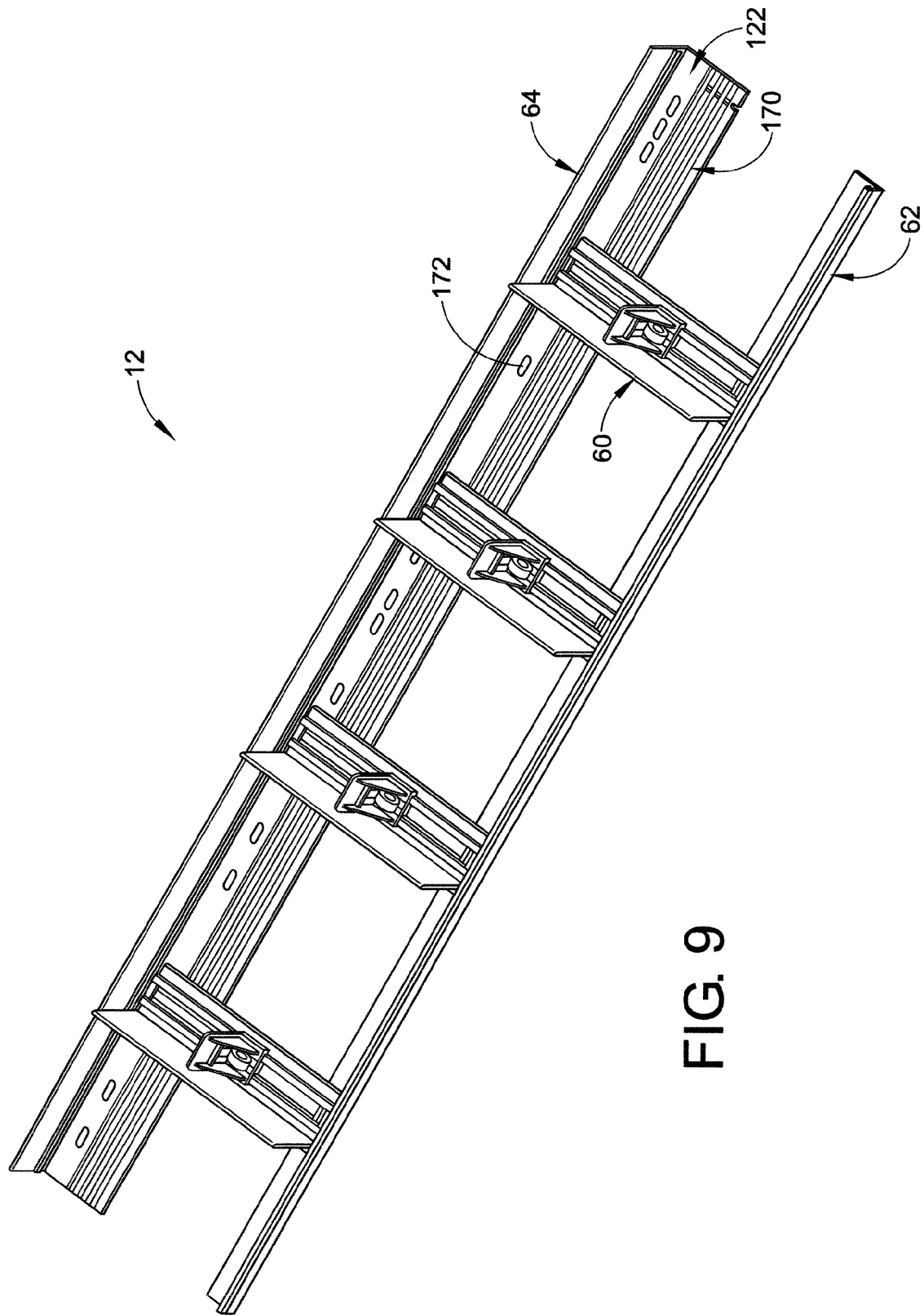
FIG. 9 is a perspective view of a further embodiment of a product inventory monitoring system according to the present disclosure, including a plurality of track units coupled to a back rail and a front rail.

FIG. 9 illustrates an elevated view of the smart shelf 12, including a plurality of track units coupled to the back rail 62 and the front rail 64. The baseplate 122 of the front rail 64 has one or more grooves along which the track units 60 can be laterally adjusted to accommodate product packages of different sizes. The grooves also add stability to track unit position and assist in maintaining a substantially perpendicular orientation of the track units 60 relative to the rails. Additionally, the front rail 64 has a plurality of holes 172 into which a front portion (e.g., a tab or the like) of the track unit 60 is inserted to hold the track unit in place. The back rail 62 optionally has similar grooves and holes.

Figure 10:
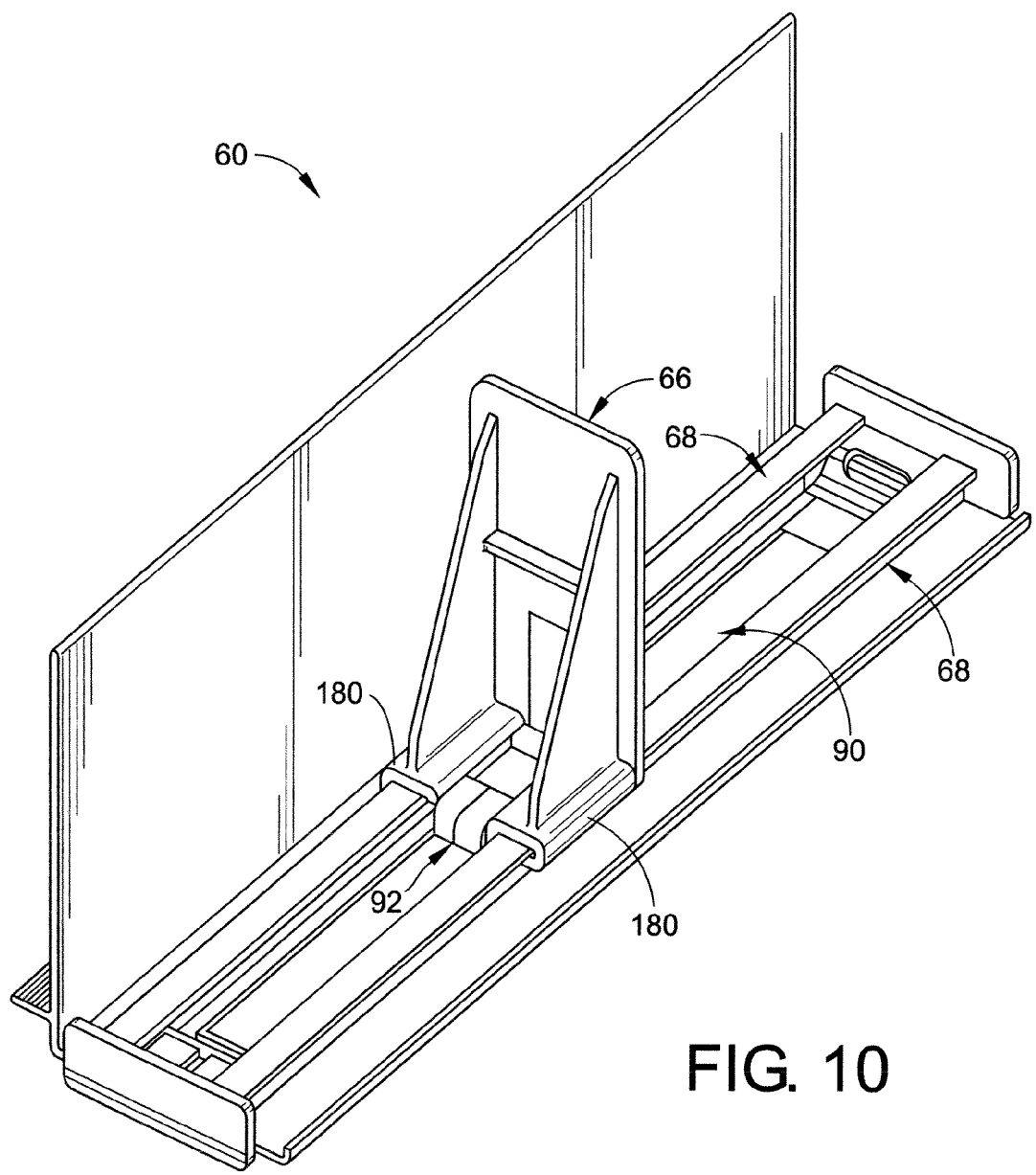
FIG. 10 is an enlarged perspective view of a track unit of the system of FIG. 9.

FIG. 10 is a perspective view of an embodiment of the track unit 60. The base plate 84 of the pusher 66 includes a pair of slides 180 adapted for locking sliding engagement with the rails 68 by means of U-shaped end pieces. Between the slides 180 is a contact pad 92, which extends downwardly beneath the slides 180, and thus between the rails 68 to contact a sensor strip 90. For certain embodiments of the present disclosure, the contact pad may simply be a pressure pad, while in other embodiments, the contact pad 66 may include electrical contacts for making electrical interconnection in manners that will become apparent below.

With a general understanding of the structure of the monitoring system described with regard to the preceding figures, an appreciation of particular embodiments thereof can be obtained with further reference to the figures previously described. In one embodiment of the disclosure, the contact pad 92 of the base plate 84 of the pusher 66 includes a magnet, and the sensor strip 90 comprises an array of magnetic reed switches and an analog resistor string interconnected to a power source. The magnet on the pusher base 84 actuates reed switches on the sensor strip 90, which in turn closes the circuit to a specific resistor value. The value of this resistance determines the voltage drop generated thereacross and, with standard voltage divider techniques, the output signal is indicative of the position of the pusher 66 upon the tracks 68. In turn, this is indicative of the number of product containers maintained upon the track.

In another embodiment, which will be discussed in detail later herein, the sensor strip 90 comprises a slider potentiometer, and the contact pad 92 is in forceful contacting engagement with the wiper of the potentiometer. Accordingly, movement of the pusher 66 causes the resistance of the sensor strip 90 to change in a manner directly analogous to the position of the pusher 66. Accordingly, the resulting voltage change is directly analogous to the number of containers of product remaining upon the track system 60.

According to another embodiment of the disclosure, a magnetic pattern may be imprinted upon the backplate 130, with the pusher 66 including a magnetic read head affixed thereto. With the magnetic pattern having a unique pattern defining a position, or a fixed set of points that may be read along the way, as the pusher 66 moves upon the tracks 68, the output of the magnet read head corresponds to the location of the pusher 66 upon the track and, consequently, the number of product containers remaining upon the associated track.

In yet another embodiment of the disclosure, a capacitance measurement may be employed to determine the location of the pusher 66. In such an embodiment, an electrical contact on the base of the contact pad 92 of the pusher 66 comprises a first electrode, while the sensor strip 90 may comprise a series of second electrodes, with the circuit upon the circuit board determining the capacitance between them. This capacitance varies as a function of the position of the pusher 66 upon the tracks 68.

In still another embodiment of the disclosure, the sensor strip 90 may comprise a first conductor that is in turn coupled to a second conductive element, such as an iron core or the like, mounted on the contact pad 92 or comprising the electrical contact of the pusher 66. As the pusher 66 moves along the inductor of the sensor strip 90, the frequency of an oscillator signal coupled thereto would change in direct relation to the distance of the pusher along the inductive strip. Accordingly, a correlation could then be made with the number of packaged products 56 maintained upon the track 68.

As a variation of the foregoing with respect to oscillator frequency, the sensor strip 90 may comprise an inductive coil, with a second conductive coil being maintained upon the contact pad 92 of the pusher 66. Energization of one of the coils will induce a voltage in the other coil corresponding to the relative position of the one to the other. In other words, the amount of coupling is directly proportional to the position of the pusher 66 and, accordingly, the amount of product being held by the track system.

In another embodiment of the disclosure, the sensor strip 90 may comprise a magneto resistive strip, the resistance of which may be varied by a magnet placed thereover. With a magnet being attached as a portion of the contact pad 92, the resulting resistance of the rod 90 may be changed as a function of the position of the pusher 66 and, accordingly, the amount of product upon the shelf.

Another structure and technique for determining the position of the pusher 66 is the use of an encoded printed circuit board. In this embodiment, an encoded conductive pattern may be printed as a printed circuit board mounted to the backplate 130, with appropriate wipers comprising the electrical contacts 140. The conductive pattern and the wipers make a unique contact arrangement corresponding to the position of pusher 66.

The instant disclosure further contemplates the implementation of strain gauges or other such transducers to assess the position of the pusher 66. In one such embodiment, a strain gauge may be mounted as part and parcel of the spring 80. As pusher 66 moves along the rails 68 toward the front wall 64, the force sensed by the strain gauge reduces, the reduction corresponding to the position of the pusher 66 and, accordingly, the amount of product held on the track or assembly.

In yet another embodiment of the disclosure, the sensor strip 90 comprises a linear variable differential transformer (LVDT), with the armature thereof being connected to and driven by the contact pad 92 of the pusher 66. Accordingly, the output signal of the LVDT corresponds to the position of the pusher 66 and the associated volume of product.

In the embodiments just described, the various contacts 140a, 140b, 140c and the buses or conductor strips 162a, 162b, and 162c engage with each other and communicate the resulting data signals to data acquisition and transceiver 70 as described above. In each of the embodiments, an electronic sensor of sorts may be employed in association with the pusher 66 to determine its position and, in turn, the user device 32 assesses the amount of product remaining on the track system 60.

Figure 11:
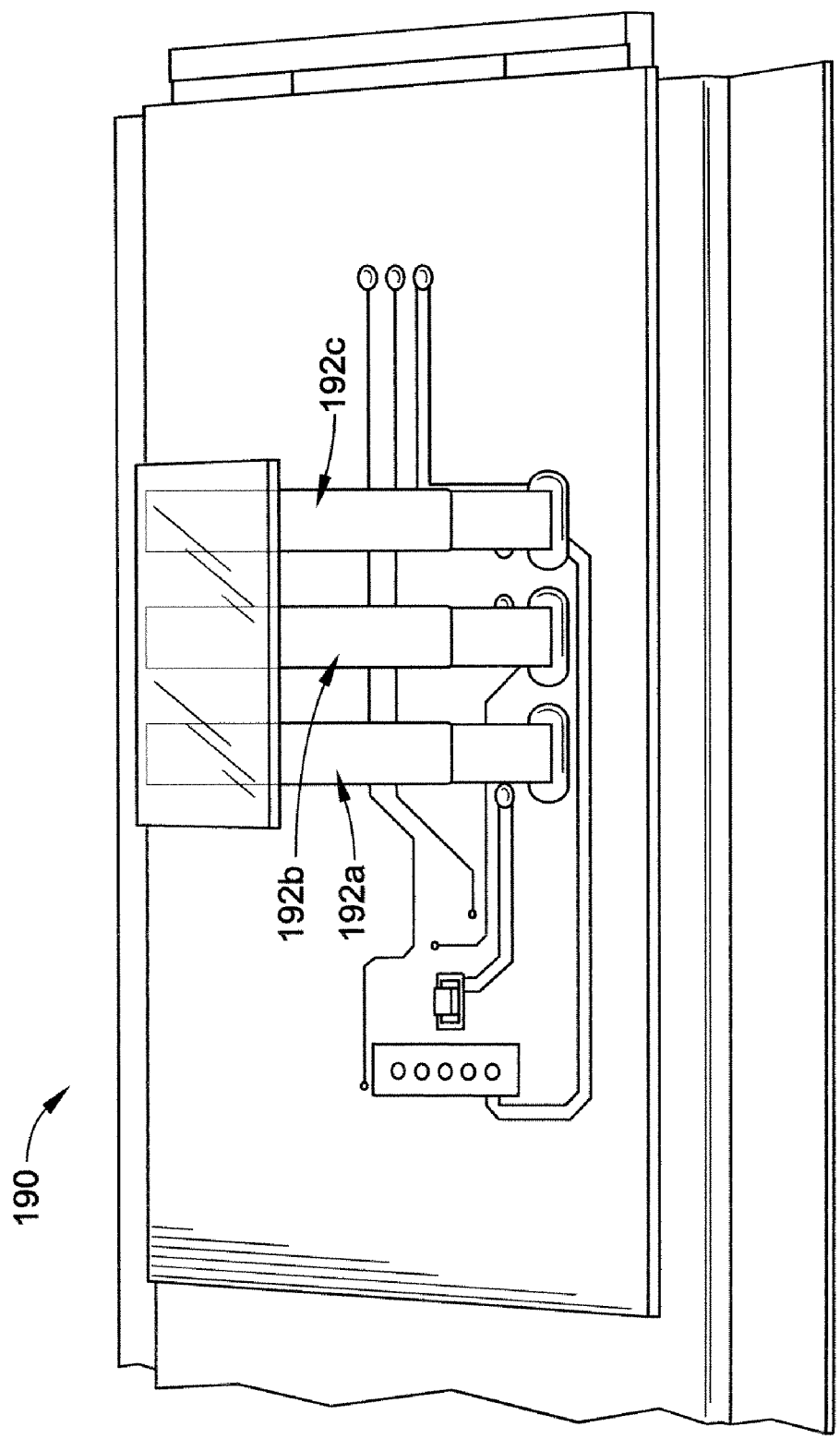
FIG. 11 depicts a monitoring component, and associated electrical contacts, which are coupled to the buses or conductor strips of the system of FIG. 9.

FIG. 11 depicts a monitoring component 190, and associated electrical contacts 192a, 192b, and 192c, which are coupled to the buses or conductor strips 162a, 162b, and 162c, respectively. The monitoring component can be mounted to the rail assembly at any location such that it maintains contact with the sensor and communicates with the contact rail assemblies for power and communication. The monitoring component 190 includes a printed circuit board with circuitry thereon, which is described in greater detail below with regard to FIGS. 14 and 15.

Figure 12:
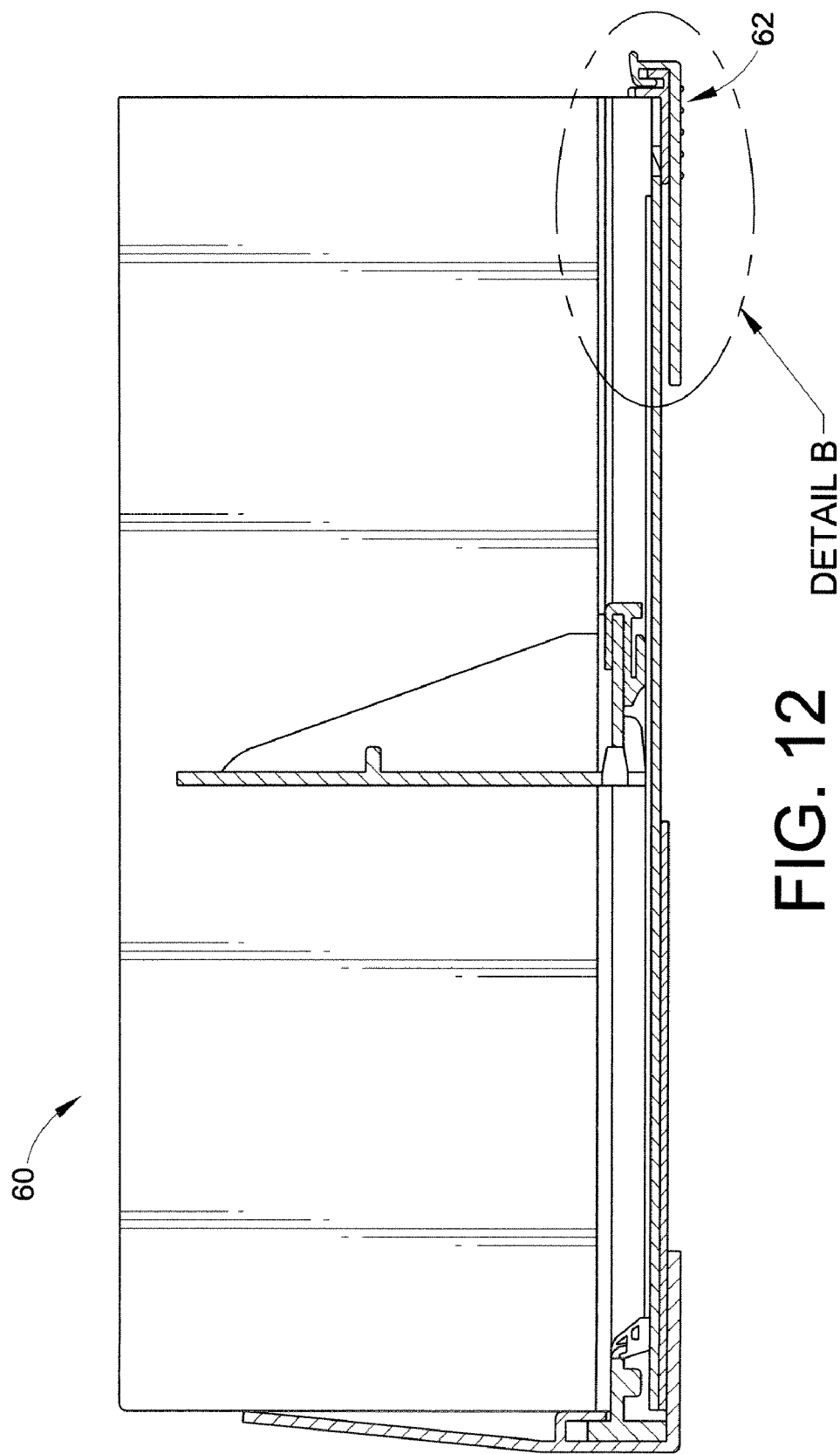
FIG. 12 is a cross sectional view of a track of the system of FIG. 9.
Figure 13:
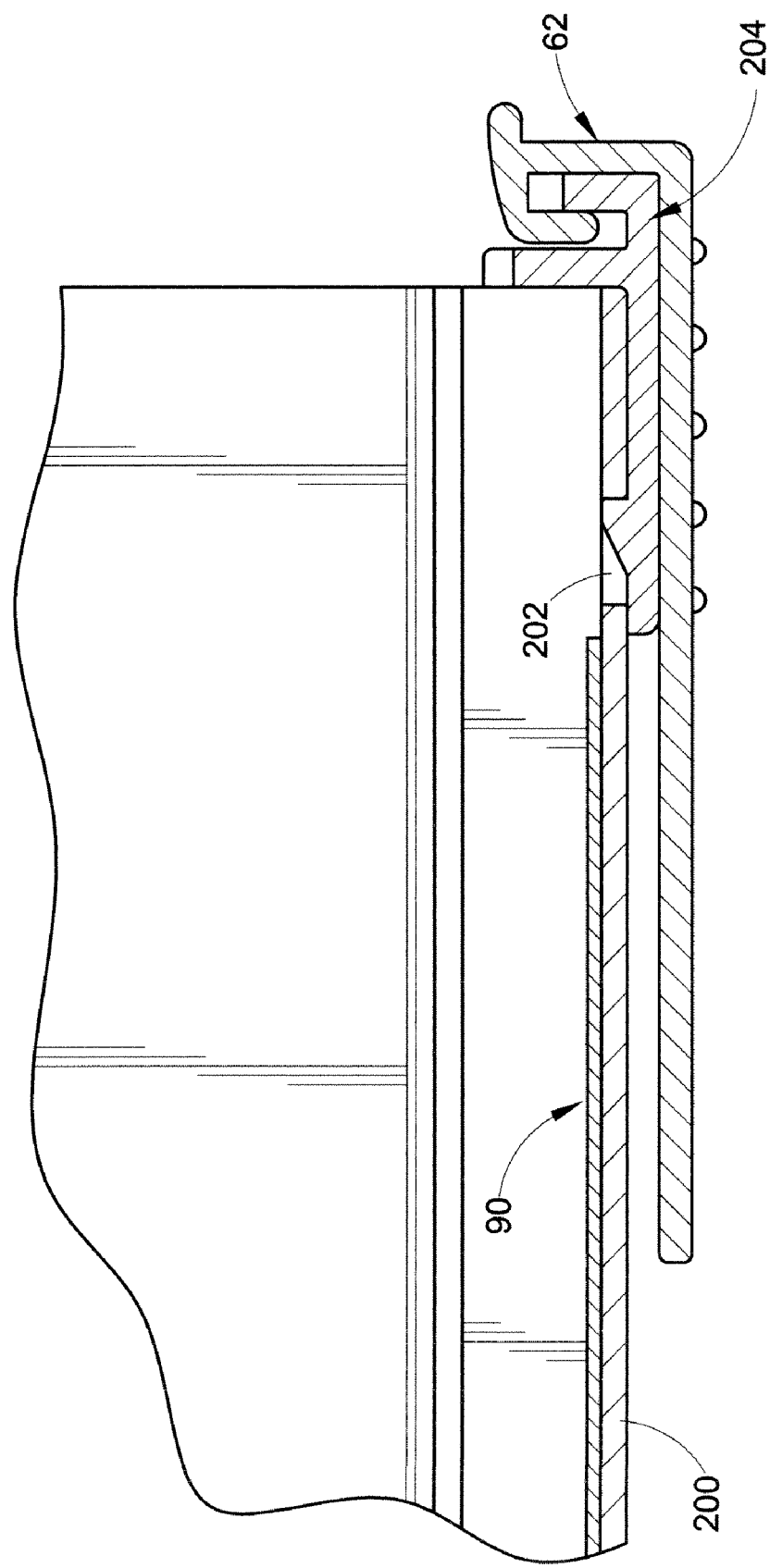
FIG. 13 is an enlarged view of a portion of FIG. 12 illustrating an interconnection between the track unit and the back rail.

FIG. 12 illustrates the track unit 60, with a rearward portion thereof, which includes the back rail 62, enclosed in an area labeled "Detail B," which is enlarged in FIG. 13 and described with regard thereto.

FIG. 13 is an enlarged view of Detail B, showing an interconnection between the track unit 60 and the back rail 62. A baseplate 200 of the track unit 60 supports the sensor strip 90 and includes a notch 202 that couples with a clip 204. The clip interlocks with the back rail 62 to secure the track unit 60 to the back rail 62.

Figure 14:
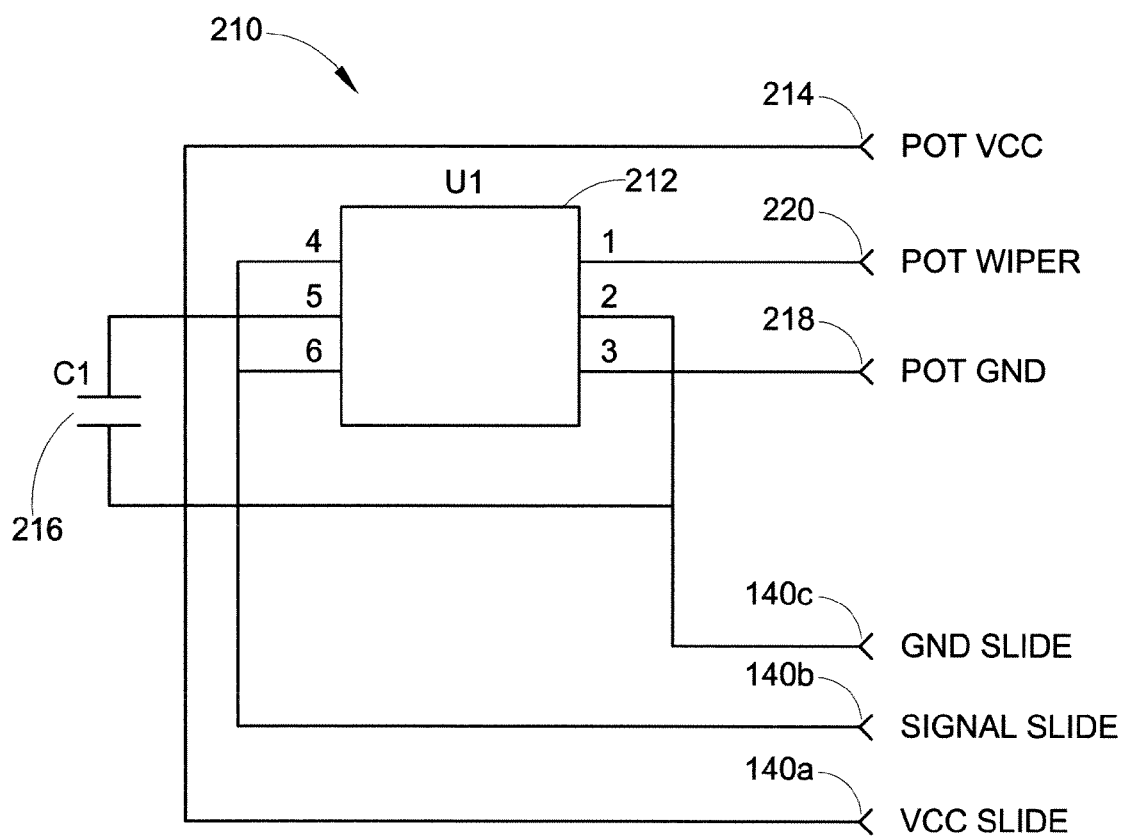
FIG. 14 is a circuit schematic of the pusher sensing circuit employed with an embodiment of the disclosure.
Figure 15:
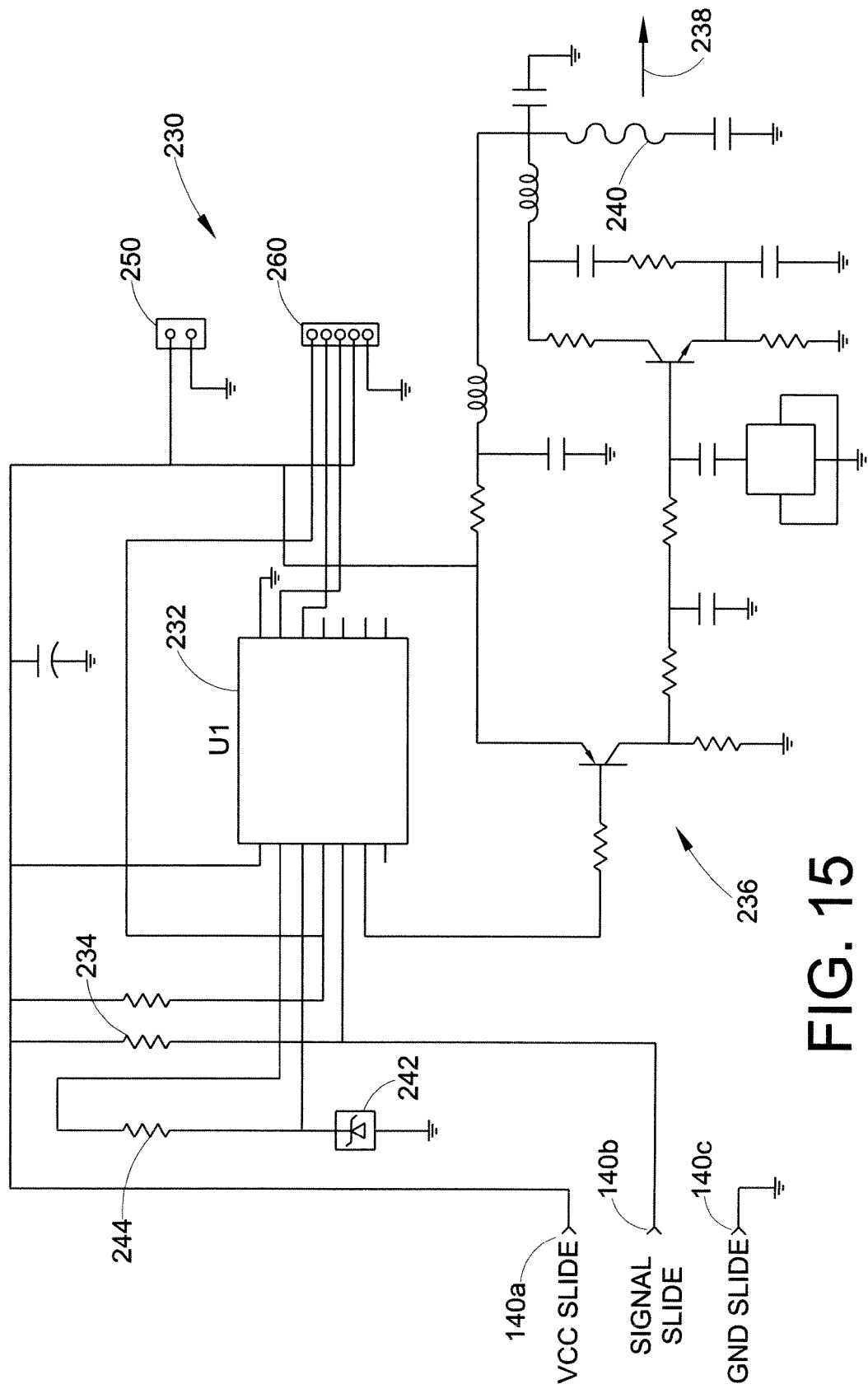
FIG. 15 is a circuit schematic of the data receiver and transmission circuitry associated with the shelf supplying monitoring system.

With reference now to FIGS. 14 and 15, an appreciation can be obtained with regard to the circuitry employed in association with an embodiment of the disclosure employing a membrane potentiometer as the sensor strip 90 as presented above and described with regard to the preceding figures. As shown in FIG. 14, a sensing circuit 210 is provided on each track system, such as the track system 12. Accordingly, the sensing circuit 210 is associated with a specific track system upon a specific shelf and is further associated with a specific pusher 66. In one embodiment, the sensor strip 90 is a membrane potentiometer in which the position of the wiper is determined by the contact pad 92 upon the pusher 66. A microprocessor chip 212 is provided as part and parcel of the sensing circuit 210 and is powered by the supply voltage provided through a spring loaded contact 140a, fed by the associated power bus 140a. The supply voltage is also provided as the input voltage to the potentiometer 90a by means of the power connector 214. A filter capacitor 216 is provided in standard fashion to keep the supply voltage stable and to eliminate noise.

The ground provided to the microprocessor chip 212 is provided by means of a spring loaded contact 140c, which is selectively interconnected to the potentiometer connector 218 by means of the microprocessor 212. The selective interconnection is undertaken in order to prevent power or battery drain through the potentiometer 90a. The output of the potentiometer 90a is provided to the microprocessor 212 through the connector 220, which is interconnected to the potentiometer wiper. Accordingly, the microprocessor 212 receives a signal corresponding to the instantaneous position of the pusher 66 and the amount of product retained thereby.

The microprocessor 212 is bidirectionally interconnected through a spring contact 140b to the signal bus 140b. In operation, the microprocessor 212 is programmed to turn on for a very slight duration, on the order of milliseconds, at predetermined intervals (e.g., 2 seconds, 3 seconds, etc.). This duty cycle may be selected to achieve the desired resolution, minimize power drain, and optimize system integrity. In any event, when the microprocessor turns on, the potentiometer ground is interconnected by means of the connector 218 and the position of the potentiometer wiper is determined by monitoring the connector 220. If the position of the potentiometer wiper has changed since the last reading, the microprocessor 212 looks to determine whether the data bus 140b is quiescent. When such quiescence is found, an output signal is emitted thereto corresponding to the new instantaneous position of the potentiometer wiper 220. This information, along with an address signal identifying the specific track system with which the microprocessor 212 is associated, is then passed to the data acquisition and transmitter circuitry 72 uniquely associated with the shelf that houses the track system and associated sensing circuit 210. The microprocessor also monitors the data bus to receive an acknowledgement from the transmitter, and continues to transmit data until a valid receipt is received.

As shown in FIG. 15, the data acquisition and transmitter circuitry 230 is interconnected to the supply voltage by means of the power bus 140a, to the ground bus 140c, and to the signal bus 140b.

The circuitry 230 prominently includes a dedicated microprocessor chip 232 that receives the data input signals from the data bus 140b, from each of the track systems associated with the shelf of the circuit 230. The data is optionally applied through a pull-up resistor 234. In another embodiment, the pull-up resistor is positioned in the track unit to permit detection of bus shorts, tampering, etc. It will be appreciated that the data received from the sensor circuit 210 (FIG. 14) associated with the particular track system 12 includes location of the track system, as well as the specific location of the pusher 60 associated therewith. The track system and/or shelf serial number is contained in the transmitter microprocessor 232. The microprocessor 232 then functions to format the various data received from the track systems of the associated shelf. The microprocessor 232 formats this data and adds the shelf serial number data for delivery to a transmitter portion of the circuitry 230. Formatting includes a designation as to the serial number or identity of the shelf, the serial number or identity of the track system (and associated pusher), the status of the battery supplying power to the circuitry associated with the shelf, a messaging sequence number to prevent duplication of data, and the like. The formatted output signal is passed through the transmitter circuitry 236 for emission as the RF signal 238 from the antenna 240. This information is then received by the receiver 24, passed through the router 28 and to the user device 32 of FIG. 1. In one embodiment, the receiver 24 is a transceiver that communicates bidirectionally with the transmitter circuitry 236.

In another embodiment, capacitive loading (e.g., one or more filter capacitors) is employed in conjunction with the circuits described herein to reduce interference that may arise from ambient sources (e.g., fluorescent lights, etc.) in the vicinity of the circuitry.

Determining the state of the battery charge is facilitated by means of the Zener diode 242 and associated resistor 244, as shown. In standard fashion, the circuitry 230 includes a battery connector 250 and a programming connector 260, the latter of which allows reprogramming of the microprocessor 232 on site. Additionally a pull-up resistor (not shown) is provided in the track unit added to allow detection of any short circuits of the track conductors and/or detection of any breaks in the connections to the track. If a fault is detected an immediate alarm message is sent.

Figure 16:
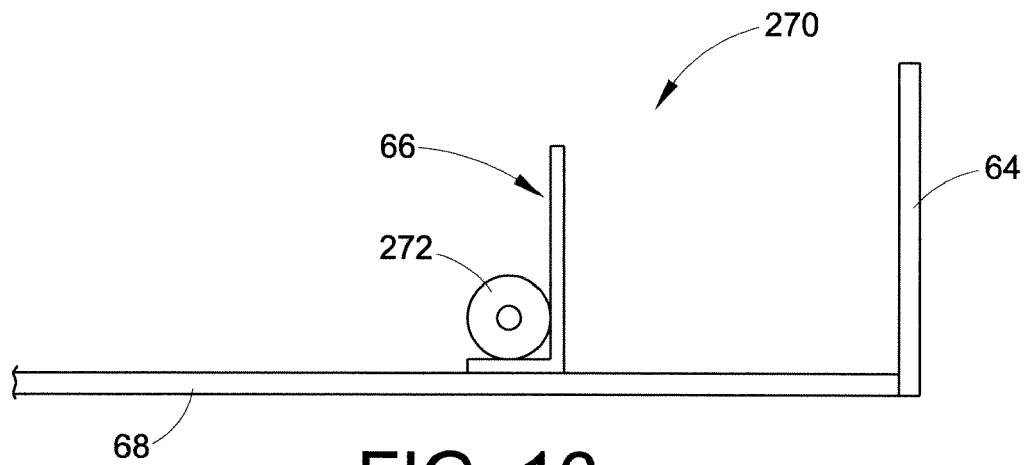
FIG. 16 is a side elevational illustrative view of another embodiment of the disclosure.

With reference now to FIG. 16, still another embodiment of the disclosure can be seen as designated generally by the numeral 270. The track system remains substantially the same as the system 12 presented above in various embodiments. However, the track system 270 employs a wheel 272 as the movement/location sensor associated with the pusher 66. The wheel 272 is operatively connected to the coil spring 80 and rotates as the spring moves. Alternatively, the wheel 272 may frictionally engage the track 68 to effect rotational movement. In either event, according to one embodiment, the wheel 272 is encoded such that it emits a signal corresponding to set fractions of rotation of the wheel 272. These fractions of rotation correlate with linear movement of the pusher 66 and, accordingly, the amount of product between the pusher 66 and the front wall 64. Such encoded wheels are, of course, will known in the art.

Alternatively, the wheel 272 may include a piezoelectric pulse generator, the movement of which generates a pulse, again corresponding to linear movement of the pusher 66. In either embodiment, a rotational member, producing signals corresponding to an amount of rotation, is correlated with the linear movement of the pusher 66 and the volume of the product.

Figure 17:
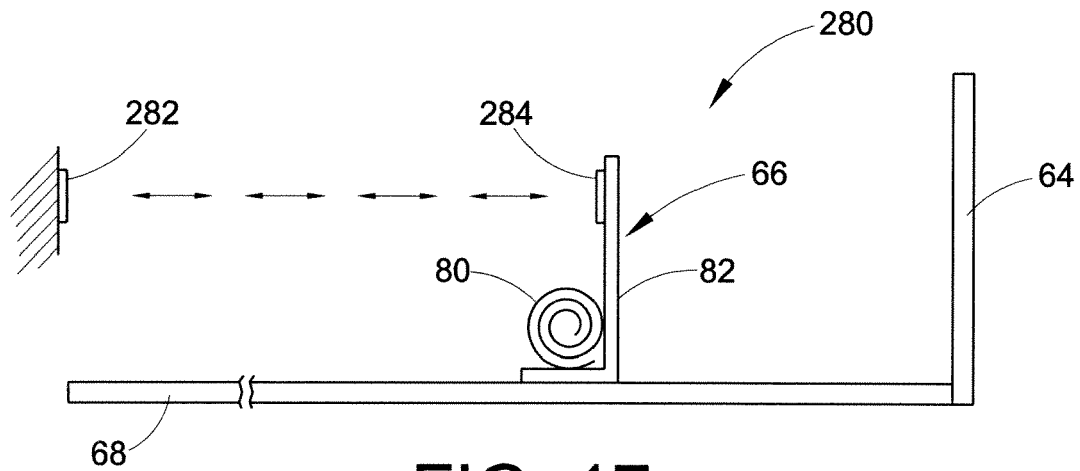
FIG. 17 is a side elevational illustrative view of still another embodiment of the disclosure.

With reference now to FIG. 17, yet another embodiment of the present disclosure is shown in the form of the track assembly 280. Again, the track assembly 280 is similar to the embodiment 12 presented above, but for the inclusion of a signal emitter 282 fixedly attached to a rear wall of the shelf assembly 280 and in communication with a receiver 284 mounted to the backplate 82 of the pusher 66.

According to one embodiment, the transmitter 282 transmits ultrasonic signals that are received by the receiver 284. The time between transmission and reception correlates to the position of the pusher 66 and, accordingly, the amount of product remaining. Alternatively, the unit 282 may be a transponder (e.g., an ultrasonic transponder, an optical or light transponder, etc.) that both sends and receives signals, and the unit 284 may be simply a reflector, reflecting the signals back to the transponder 282. In either event, the position of the pusher 50 is correlated with the time of travel of the ultrasonic signals, which in turn correlates to distance.

The track system 280 may also operate as an optical system. In this embodiment, the unit 282 may comprise a light emitter and an array of photocell receivers. The unit 284 can be simply a reflector on the back of the pusher 66. As light is emitted by the emitter/receiver 282, it impinges upon the reflector 98 and is reflected back to the receiver portion of the unit 282. The particular photocell that is impinged by the light can be coordinated with the position of the pusher 66 using triangulation techniques.

According to still another embodiment of the track system 280, the transmitter 282 can be of various natures, such as optical, magnetic, radio frequency, acoustic, or the like. The signal emitted would be received by the receiver 98 (and/or signal monitoring circuitry) and the signal strength received would correlate with the position of the pusher 66 and, again relate to the amount of product retained by the track system 280.

The system 280 may also function in association with radar ranging techniques. With the unite 282 being a millimeter wavelength radar transponder, and the unit 284 a reflector (or receiver), the location of the pusher 66 can be readily determined within a millimeter as a function of the time elapsing between emission and reception of the radar signal. Accordingly, the location of the pusher 66 can be determined and the amount of product thereby assessed.

Figure 18:
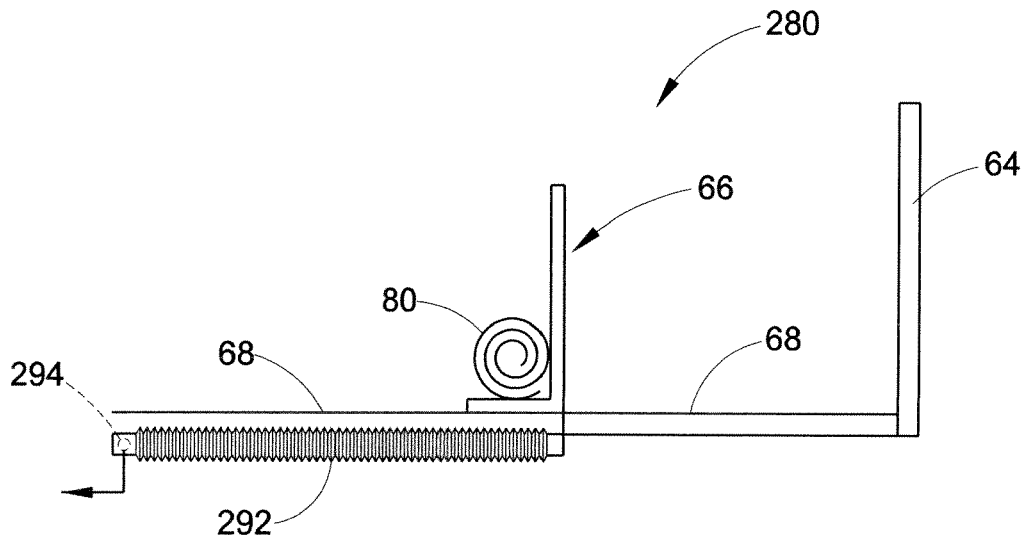
FIG. 18 is a side elevational illustrative view of still a further embodiment of the disclosure.

With reference now to FIG. 18, another embodiment of the track system of the present disclosure can be seen as designated by the numeral 290. In this embodiment, a pressure bellows or air spring or air cylinder/piston arrangement can be employed. This operative structure is designated by the numeral 292 and includes herein a pressure sensor 294. With the pusher 66 being connected to the pressure bellows or air spring, or to the air piston received within an air cylinder, the pressure maintained within the unit 292, as sensed by the pressure sensor 294, would correlate with the position of the pusher 66 and, accordingly, the amount of product retained within the track.

It will be readily appreciated that each of the system described above is operative to provide instantaneous information, depending upon the duty cycle of inquiry, as to the location of the pusher 66. Accordingly, the data can not only be correlated with the amount of product remaining on the track, but can also determine, in conjunction with the user device 32, when the product was removed, and whether an abnormal amount of product was removed at any given time, indicating the possibility of theft. In such an instance, the user device 32 could highlight the activity by means of CCTV TV camera 40 having the track system of interest within its view. An alarm (not shown) could also be activated so that store personnel could take appropriate remedial action.

Figure 19:
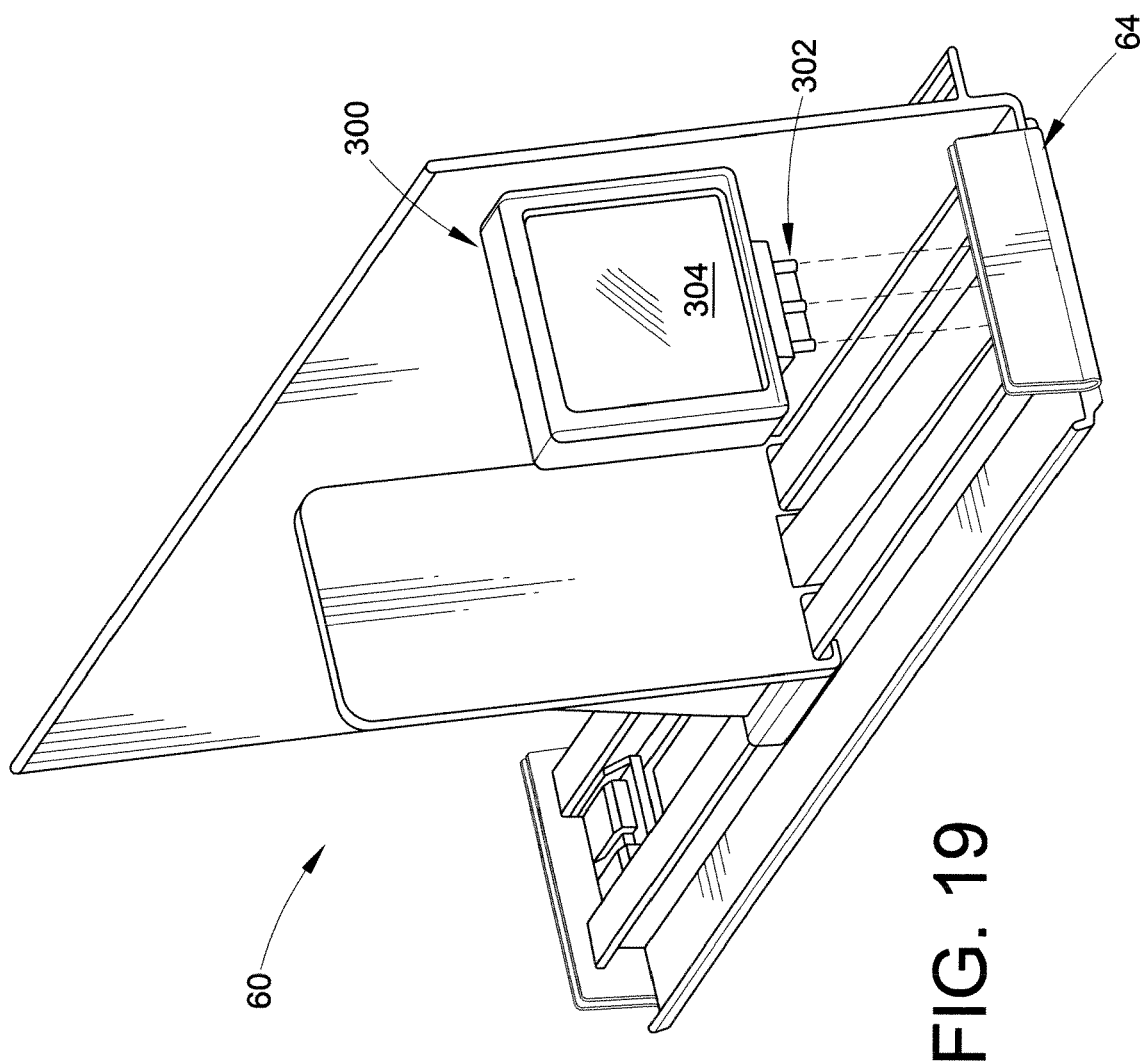
FIG. 19 is an exploded perspective view of an embodiment of a track unit in which a display device 300 is coupled to the track unit near a front rail.

FIG. 19 illustrates an embodiment of the track unit 60 in which a display device 300 is coupled to the track unit 60 near the front rail 64. The display device 300 comprises an interface 302 that removably couples to the track unit 60, and a screen 304 on which product information can be displayed. For instance, when a product is coupled to the track unit (e.g., by scanning barcodes on the track unit and the product to be place therein), product information (e.g., price, discounts, sale conditions, etc.) can be received from the user device 32 (FIG. 1) and presented to customers via the screen 30. In another embodiment, the screen comprises a plurality of differently colored LEDs that can indicate different conditions to store personnel. For instance, a red LED can indicate an empty track unit; a yellow LED can indicate a low-stock condition, and so on.

Figure 20:
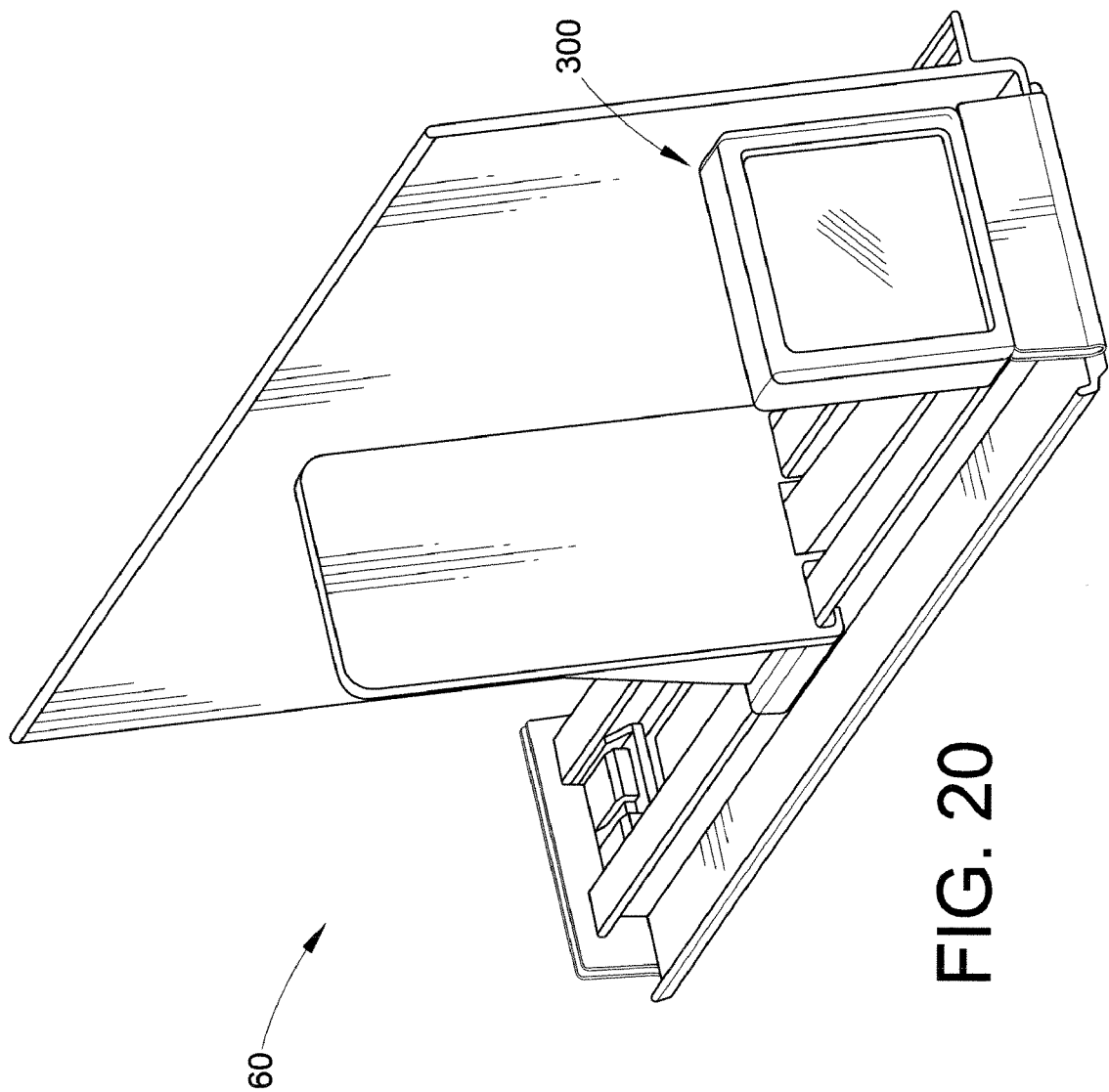
FIG. 20 is an illustration of the track unit of FIG. 19, with the display device in its coupled position at the front of the track unit.

FIG. 20 is an illustration of the track unit 60 with the display device 300 in its coupled position at the front of the track unit.

FIG. 21 depicts an example of a low stock report 310 that can be generated using the system(s) described herein to facilitate efficient and timely restocking of shelves in a store. A plurality of products is shown as well as respective product counts, shelf identities, and shelf locations. Where a product count is shown as zero (0), a store employee can quickly restock the associated shelf because the report indicates the location of the shelf and the product that requires restocking.

FIG. 22 illustrates another example of a pilferage report 320 that can be generated using the system(s) described herein. For instance, high-priced items such as pregnancy tests, which are typically only purchased in small numbers, are depicted in the report. A product count difference of 7 units since a last reading can trigger an alert to a store manager, who can then access the CCTV system 44 to review video of section 2 in the store in order to determine whether a theft has occurred or is in progress and to identify the potential thief.

Thus it can be seen that the disclosure contemplates the presentation of numerous and various means for sensing the position of a specific pusher associated with a specific track system located in conjunction with a specific shelf within a retail establishment. This data, for all such pusher and track systems within the establishment is acquired and passed to a transmitter 70, for radio frequency transmission to a receiver 24, which then passes it through a router 28 to a user device 32. This data is acquired routinely and sequentially, at a rapid duty cycle, such that instantaneous information regarding the status of all products within the retail establishment can be monitored and obtained. Any rapid changes in product at a particular location, signaling theft, accident or the like, can be immediately monitored and an appropriate alarm or remedial action commenced. Inventory control is greatly facilitated and assurance that an out of stock situation is not experienced is possible, by relaying instructions to the PDA 44.

Figure 23:
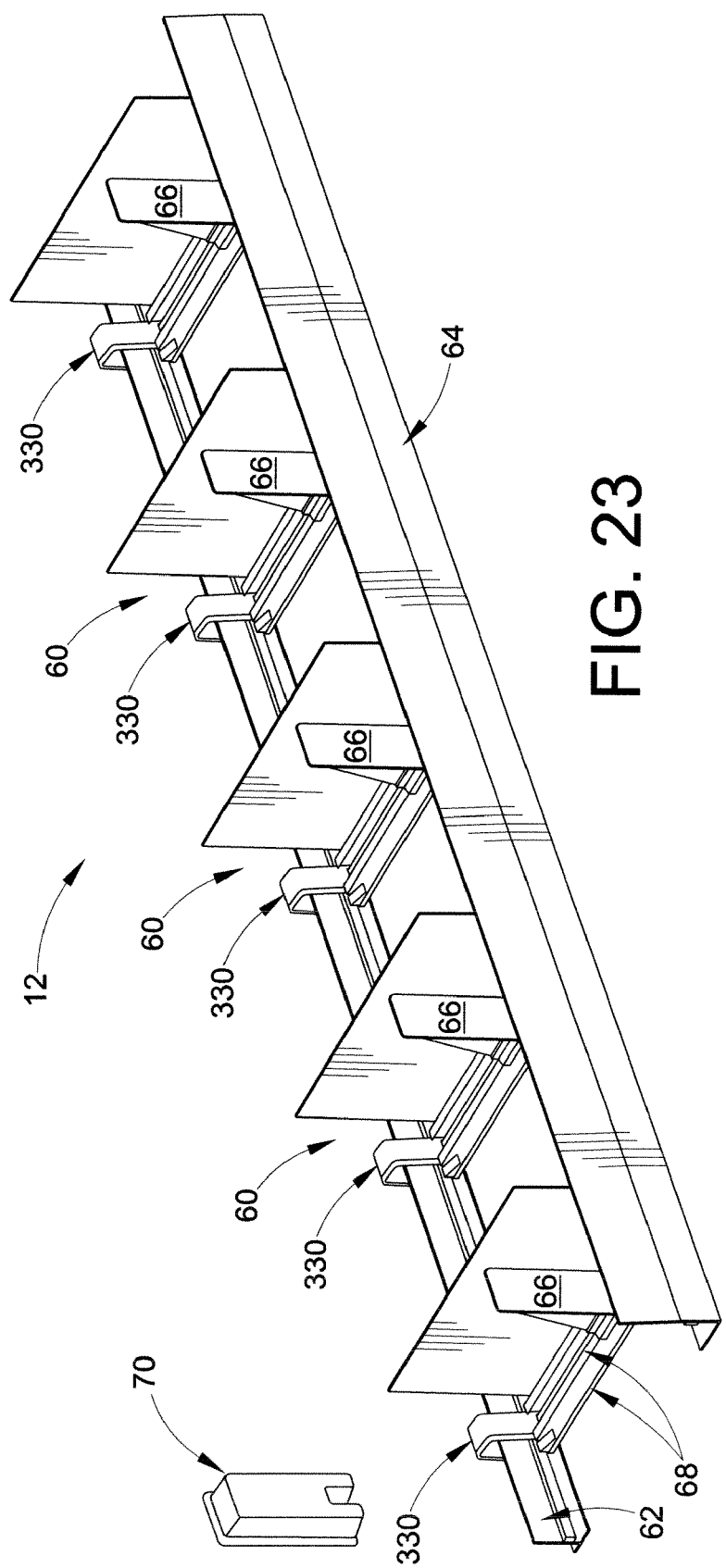
FIG. 23 illustrates another embodiment of the shelf system, comprising a plurality of track units that receive product and are disposed between a back rail and a front rail.

FIG. 23 illustrates another embodiment of the shelf system, comprising a plurality of track units 60 that receive product and are disposed between a back rail 62 and a front rail 64. The track units 60 are oriented normal to the rails 62, 64, and comprise a pusher 66 that urges product toward the front rail 64, such that when a consumer removes a product unit, remaining product units in the track 60 are pushed forward in an orderly fashion and retained between the pusher 66 and the front rail 64. The pusher 66 moves between the back rail 62 and the front rail 64 along a pair of tracks 68.

The system further comprises a wireless transceiver 70 that receives information from, and transmits information to, each track unit 60. For instance, the transceiver 70 can receive information related to pusher position at predetermined temporal intervals.

Figure 24:
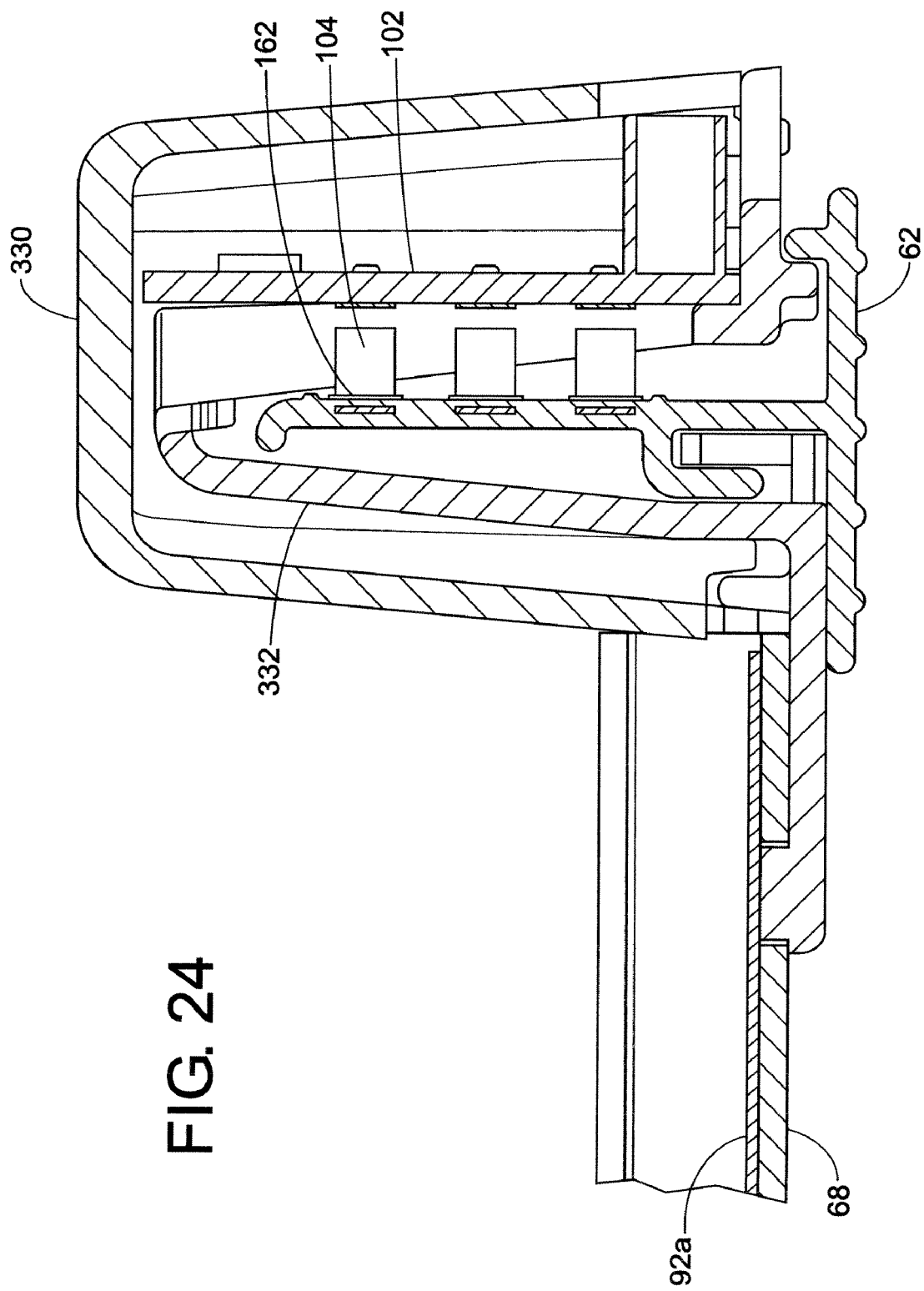
FIG. 24 is a cross-sectional view of the back clip housing and associated components.

Each track unit additionally includes a back clip housing or cover 330 that covers a back clip housing and other components described in more detail with regard to FIG. 24.

FIG. 24 is a cross-sectional view of the back clip housing 330 and associated components. A pusher track 68 and potentiometer 92a are coupled to a back clip housing 332 with a PCB 102 that is covered by the back clip cover 330. The cover 330 covers a portion of the back rail 62 that includes a plurality of spring connectors 104 and associated copper conductive strips 162. The clip cover 330 provides additional protection for the track unit circuitry to reduce damage caused by spills, dust or dirt, tampering, etc.

Figure 25:
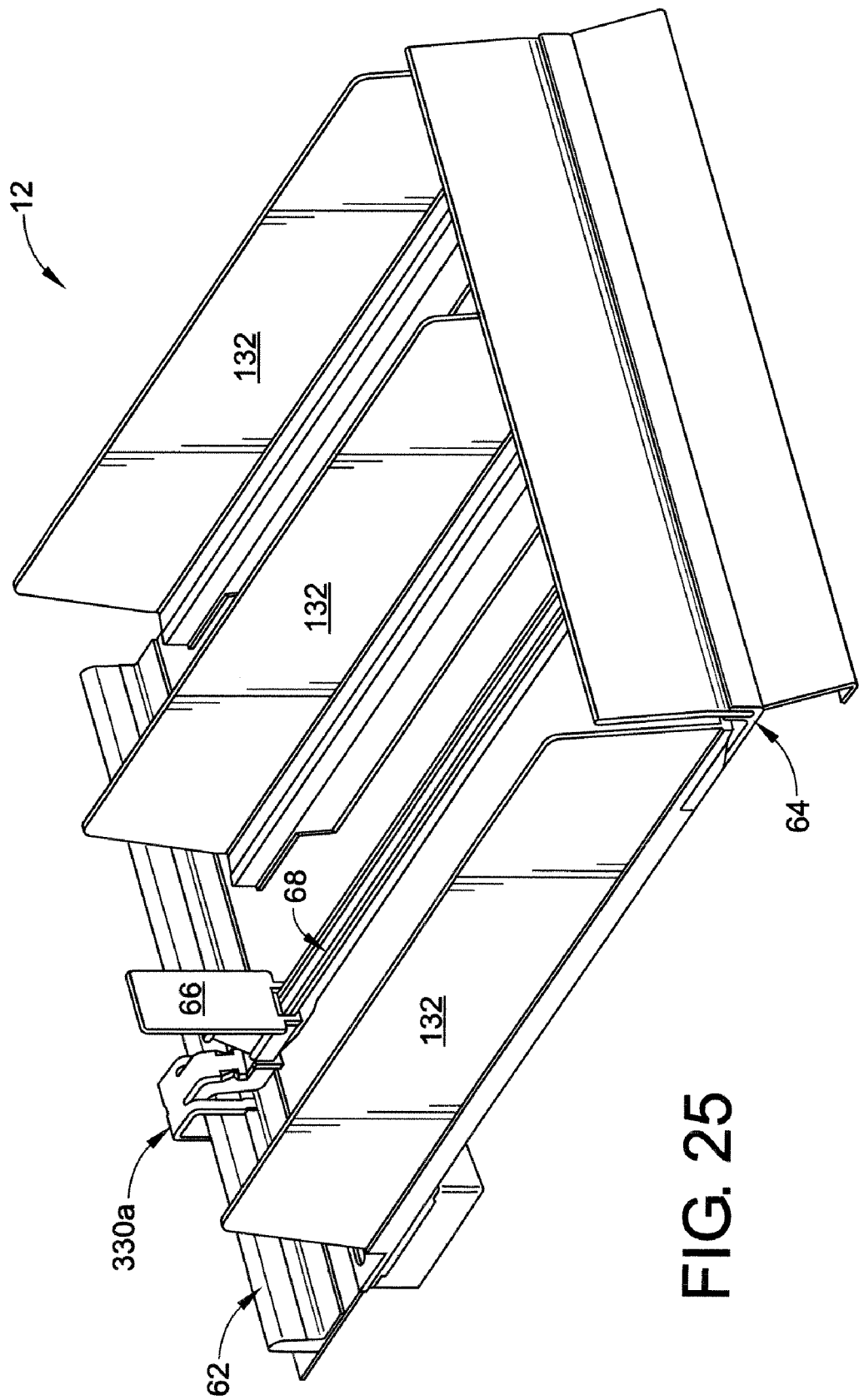
FIG. 25 illustrates another embodiment of the shelf system with a back clip cover that covers several components of the system.

FIG. 25 illustrates another embodiment of the shelf system with a back clip cover 330a that covers several components of the system. The system comprises a plurality of track units that receive product and are disposed between a back rail 62 and a front rail 64. The track units 60 are oriented normal to the rails 62, 64, and comprise a pusher 66 that urges product toward the front rail 64, such that when a consumer removes a product unit, remaining product units in the track 60 are pushed forward and retained between the pusher 66 and the front rail 64, and on at least one side by a divider 132. The pusher 66 moves between the back rail 62 and the front rail 64 along one or more tracks 68. Each track unit additionally includes a back clip housing or cover 330a that covers a back clip housing and other components described in more detail with regard to FIG. 26.

Figure 26:
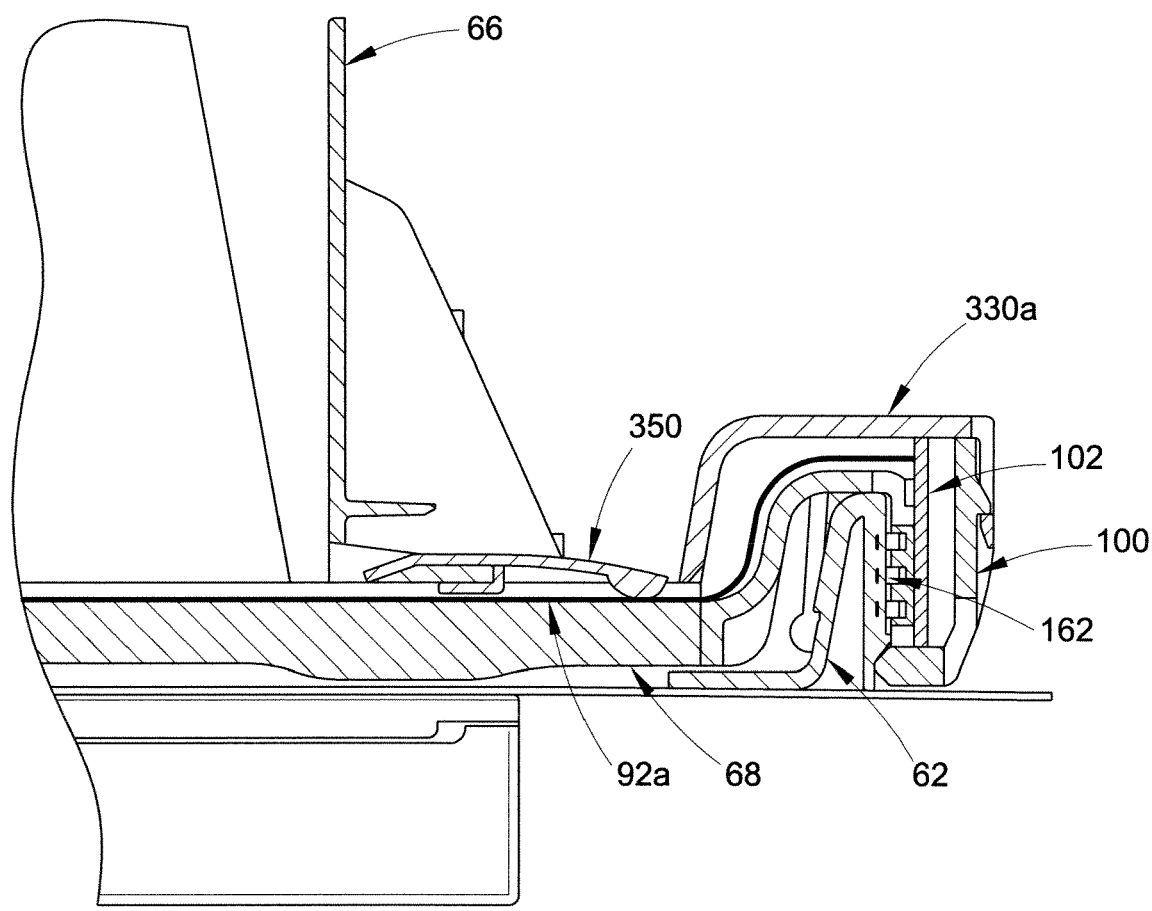
FIG. 26 is a cross-sectional view of the back clip housing and associated components.

FIG. 26 is a cross-sectional view of the back clip housing 330a and associated components. A pusher track 68 and potentiometer 92a are coupled to a pusher paddle 66 and to a back clip 100 with a PCB 102 that is covered by the back clip cover 330a. The cover 330a covers a portion of the back rail 62 that includes a plurality of spring connectors and associated copper conductive strips 162. The clip cover 330a provides additional protection for the track unit circuitry to reduce damage caused by spills, dust or dirt, tampering, etc. The system also includes an actuator or contact pad 350 that exerts a force on the potentiometer 92a to indicate the location of the pusher paddle 66 on the track 68. In this embodiment, the coil spring that urges the pusher paddle towards the front of the track 68 is not shown.

Thus it can be seen that the various aspects of the disclosure have been satisfied by the structure and methodology presented above. While in accordance with the patent statues only the best known and preferred embodiments of the disclosure have been presented and described in detail, the disclosure is not limited thereto or thereby. Accordingly, for an appreciation of the true scope and breadth of the subject disclosure, reference should be made to the following claims and the equivalents thereof.

What is claimed is:

1. An inventory shelf monitoring system, comprising:
at least one track system mounted on an associated shelf, the track system including a track receiving a pusher that is biased toward a front end of the track;
a sensor fixed in relation to the track;
an actuator attached to the pusher and in communication with the sensor, the sensor emitting a first output signal corresponding to an instantaneous location of the pusher in relation to the track;
a microprocessor coupled to the sensor, wherein the microprocessor controls power to the sensor and measures pusher position;
an electric bus located adjacent a rear end of the track, wherein the microprocessor is coupled to the electric bus;
a data acquisition and transmitter circuit associated with the associated shelf and in data receiving communication with the sensors of the track system by receipt of the first output signals, the acquisition and transmitter circuit emitting a second output signal corresponding to the identity and location of the pusher of the at least one track system located on the associated shelf as a function of measured pusher position; and
a receiver receiving the second output signals;
wherein the sensor comprises a potentiometer and the actuator comprises a contact member on the pusher, the contact member defining the signal wiper of the potentiometer.

2. The inventory shelf monitoring system according to claim 1, wherein the track system has a wiper contact in contacting engagement with the bus.

3. The inventory shelf monitoring system according to claim 2, wherein a plurality of buses is provided, including a ground bus, a signal bus, and a voltage supply bus.

4. The inventory shelf monitoring system according to claim 3, wherein the microprocessor comprises:
a first port coupled to a potentiometer signal wiper;
a second port coupled to the ground bus and to an anode of a capacitor;
a third port coupled to a potentiometer ground wiper;
a fourth port coupled to the signal bus;
a fifth port coupled to a cathode of the capacitor; and
a sixth port coupled to the signal bus and to the fourth port; and
wherein the voltage supply bus is coupled to a potentiometer voltage wiper to provide a voltage thereto.

5. The inventory shelf monitoring system according to claim 4, wherein the plurality of buses is interconnected between the data acquisition and transmitter circuit of the associated shelf and the microprocessor of the sensor circuit of each of the track systems located on the associated shelf.

6. The inventory shelf monitoring system according to claim 1, wherein the electric bus is mounted to a housing such that it is oriented vertically.

7. The inventory shelf monitoring system according to claim 1, wherein the actuator comprises a rotary wheel operatively connected to the pusher and emitting a signal to the sensor corresponding to rotational activity of the wheel, wherein the wheel is at least one of an encoded wheel and piezoelectric pulse generator.

8. The inventory shelf monitoring system according to claim 1, wherein the sensor comprises an ultrasonic transponder, sending and receiving ultrasonic waves, the actuator comprising a reflector attached to the pusher reflecting the ultrasonic waves from the transponder back to the transponder.

9. The inventory shelf monitoring system according to claim 1, wherein the sensor comprises a light transponder having a light emitter and an array of light receivers, and the actuator comprises a reflector attached to the pusher reflecting light from the emitter back to the array of light receivers.

10. The inventory shelf monitoring system according to claim 1, wherein the actuator comprises a signal strength monitor, monitoring the strength of a signal taken from the group of optical, magnetic, radio frequency and acoustic signals, the signal strength being indicative of a position of the pusher.

11. The inventory shelf monitoring system according to claim 1, wherein the sensor comprises a radio transponder having a radar sender and receiver, and the actuator comprises a reflector attached to the pusher reflecting radar signals received from the sender to the receiver.

12. The inventory shelf monitoring system of claim 1, further comprising a central processing unit in communication with the receiver.

13. A product inventory monitoring system, comprising:
   a front rail;
   a back rail spaced from the front rail;
   a plurality of track units coupled to the front rail and the back rail to form a modular system, each track unit comprising:
      a spring-loaded pusher that applies force to one or more associated product packages to urge the one or more associated packages toward the front rail;
      a contact pad mounted on a bottom face of the pusher in contact with a sensor strip mounted to the track, the sensor strip being electrically coupled to a microprocessor in a sensor circuit, wherein the microprocessor is in turn coupled to a plurality of buses mounted to one of the front rail and the back rail;
      a power source that supplies a voltage to the one of the front rail and the back rail; and
      a data acquisition and transmitter circuit that is coupled to the track unit and determines a position of the pusher as a function of a voltage difference between the power supply and a voltage detected across the sensor strip; and
   a user device that receives pusher position information and generates a report comprising information related to product package count in each of the plurality of track units;
   wherein the sensor strip includes a slider potentiometer.

14. The system according to claim 13, wherein the plurality of buses includes a ground bus, a signal bus, and a voltage supply bus.

15. The system according to claim 13, wherein the microprocessor comprises:
   a first port coupled to a potentiometer signal wiper;
   a second port coupled to the ground bus and to an anode of a capacitor;
   a third port coupled to a potentiometer ground wiper;
   a fourth port coupled to the signal bus;
   a fifth port coupled to a cathode of the capacitor; and
   a sixth port coupled to the signal bus and to the fourth port; and
   wherein the voltage supply bus is coupled to a potentiometer voltage wiper to provide a voltage thereto.

* * * * *